(12) United States Patent
Ando

(10) Patent No.: US 11,153,401 B2
(45) Date of Patent: Oct. 19, 2021

(54) INFORMATION PROCESSING SYSTEM, INFORMATION PROCESSING APPARATUS, AND METHOD OF PROCESSING INFORMATION

(71) Applicant: Ricoh Company, Ltd., Tokyo (JP)

(72) Inventor: Mitsuo Ando, Fukuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 40 days.

(21) Appl. No.: 16/574,613

(22) Filed: Sep. 18, 2019

(65) Prior Publication Data

US 2020/0106849 A1 Apr. 2, 2020

(30) Foreign Application Priority Data

Sep. 28, 2018 (JP) .............................. JP2018-186000
Sep. 28, 2018 (JP) .............................. JP2018-186001
Mar. 8, 2019 (JP) .............................. JP2019-043071

(51) Int. Cl.
*H04L 29/08* (2006.01)
*G06F 3/14* (2006.01)

(52) U.S. Cl.
CPC ............ *H04L 67/2814* (2013.01); *G06F 3/14* (2013.01)

(58) Field of Classification Search
None
See application file for complete search history.

(56) References Cited

U.S. PATENT DOCUMENTS

| | | | |
|---|---|---|---|
| 2003/0126326 A1* | 7/2003 | Nomizo | G06F 3/033 710/72 |
| 2004/0075857 A1 | 4/2004 | Akiyoshi et al. | |
| 2004/0218208 A1 | 11/2004 | Akiyoshi et al. | |
| 2004/0255263 A1 | 12/2004 | Ando | |
| 2006/0070087 A1 | 3/2006 | Ando et al. | |
| 2007/0047017 A1 | 3/2007 | Ando et al. | |
| 2007/0124510 A1 | 5/2007 | Ando | |
| 2007/0234238 A1* | 10/2007 | Komamura | G06F 16/34 715/857 |

(Continued)

FOREIGN PATENT DOCUMENTS

JP 2013-077279 4/2013
JP 2014-149633 8/2014

*Primary Examiner* — Brian Whipple
(74) *Attorney, Agent, or Firm* — Xsensus LLP

(57) ABSTRACT

An information processing system includes one or more intermediary apparatuses communicable with one or more output apparatuses, and an information processing apparatus communicable with the one or more intermediary apparatuses. The information processing apparatus includes circuitry configured to receive, from a terminal, specific information and a process execution request input to the terminal, identify a specific intermediary apparatus associated with a specific output apparatus based on the specific information in accordance with the process execution request, and transmit the process execution request to the identified specific intermediary apparatus. The identified specific intermediary apparatus is configured to perform processing in accordance with the process execution request transmitted from the circuitry of the information processing apparatus to control the specific output apparatus.

13 Claims, 35 Drawing Sheets

(56) References Cited

U.S. PATENT DOCUMENTS

| | | |
|---|---|---|
| 2007/0282748 A1* | 12/2007 | Clair ................... H04L 41/069 705/51 |
| 2008/0005029 A1 | 1/2008 | Ando |
| 2008/0066084 A1 | 3/2008 | Akiyoshi et al. |
| 2008/0098389 A1 | 4/2008 | Akiyoshi et al. |
| 2009/0019440 A1 | 1/2009 | Ando |
| 2009/0276826 A1 | 11/2009 | Ando |
| 2009/0316206 A1* | 12/2009 | Anezaki ............... G06F 3/1204 358/1.15 |
| 2010/0309502 A1 | 12/2010 | Ando et al. |
| 2010/0328225 A1* | 12/2010 | Black .................. G06F 40/174 345/173 |
| 2013/0073719 A1 | 3/2013 | Ando |
| 2013/0114095 A1 | 5/2013 | Akiyoshi et al. |
| 2013/0185605 A1 | 7/2013 | Ando et al. |
| 2013/0242331 A1 | 9/2013 | Ando |
| 2013/0258407 A1 | 10/2013 | Akiyoshi et al. |
| 2013/0308161 A1 | 11/2013 | Ando et al. |
| 2014/0016165 A1 | 1/2014 | Ando |
| 2014/0139658 A1* | 5/2014 | Dhanvantri ........... H04L 67/025 348/85 |
| 2015/0186188 A1 | 7/2015 | Ando |
| 2015/0264200 A1 | 9/2015 | Ando |
| 2015/0281332 A1 | 10/2015 | Naito et al. |
| 2016/0119506 A1 | 4/2016 | Namihira et al. |
| 2016/0342577 A1 | 11/2016 | Ando |
| 2017/0102865 A1 | 4/2017 | Ando |
| 2017/0272601 A1 | 9/2017 | Ando |
| 2017/0339232 A1 | 11/2017 | Ando |
| 2018/0084121 A1 | 3/2018 | Ando |
| 2018/0176417 A1 | 6/2018 | Ando |

* cited by examiner

FIG. 8

| TENANT ID | COMMUNICATION ID | ADDRESS INFORMATION | STATE INFORMATION | BROWSER ID | BROWSER STATE | PASSCODE |
|---|---|---|---|---|---|---|
| T001 | Eg001-01 | 10.56.60.xx | BEING CONNECTED | BROWSER1 | POWER ON | 1234 |
| | Eg001-02 | 196.168.0.xx | NOT CONNECTED | BROWSER2 | POWER SAVING | 2293 |
| | .. | .. | .. | BROWSER3 | POWER OFF | 8341 |
| .. | | | | .. | .. | .. |

| REGISTRATION ID | IN-APPLICATION ID | OUT-APPLICATION ID | BROWSER ID |
|---|---|---|---|
| Tag_Ed | AP_EdPortal | – | – |
| Tag_St | AP_StPortal | – | – |
| *Tag_StPhotoCode* | *AP_StPhoto* | *AP_PhotoDoc* | – |
| Tag_StPhoto1 | AP_StPhoto | AP_PhotoDoc | BROWSER1 |
| Tag_StPhoto2 | AP_StPhoto | AP_PhotoDoc | BROWSER2 |
| Tag_StPhoto3 | AP_StPhoto | AP_PhotoDoc | BROWSER3 |
| *Tag_StDocCode* | *AP_StDoc* | *AP_PhotoDoc* | – |
| Tag_StDoc1 | AP_StDoc | AP_PhotoDoc | BROWSER1 |
| Tag_StDoc2 | AP_StDoc | AP_PhotoDoc | BROWSER2 |
| Tag_StDoc3 | AP_StDoc | AP_PhotoDoc | BROWSER3 |

| APPLICATION ID | APPLICATION TYPE | URL | CORRESPONDING BROWSER |
|---|---|---|---|
| AP_PhotoShow | Out | https://daas.com/photoshow | APPARATUS-USE BROWSER, TERMINAL-USE BROWSER |
| AP_Upload | In | https://daas.com/upload | TERMINAL-USE BROWSER |
| AP_PhotoDoc | Out | https://daas.com/photoDoc | APPARATUS-USE BROWSER |
| AP_EdPortal | – | https://daas.com/EdPortal | TERMINAL-USE BROWSER |
| AP_StPortal | In | https://daas.com/StPortal | TERMINAL-USE BROWSER |
| AP_StPhoto | In | https://daas.com/StPhoto | TERMINAL-USE BROWSER |

FIG. 14

| TENANT ID | USER ID | USEABLE APPLICATION | USEABLE BROWSER |
|---|---|---|---|
| T001 | student | AP_Upload,AP_StPortal | — |
| | taro | AP_Upload, AP_PhotoDoc, AP_EdPortal | BROWSER1, BROWSER2 |
| | jiro | AP_Upload, AP_PhotoDoc, AP_EdPortal | BROWSER1, BROWSER3 |

| TENANT ID | FILE ID | FILE NAME | DATE | FORMAT | NUMBER OF PAGES | CLASSIFI-CATION | GRADE | CLASS | STUDENT NUMBER | GROUP |
|---|---|---|---|---|---|---|---|---|---|---|
| 1 | 1234 | a.jpeg | 9/15 | Jpeg | 1 | STUDENT | 3 | 2 | 12 | 3 |
| | 1235 | Doc.pdf | 10/12 | Pdf | 10 | TEACHER | — | — | — | — |

125

FIG. 32
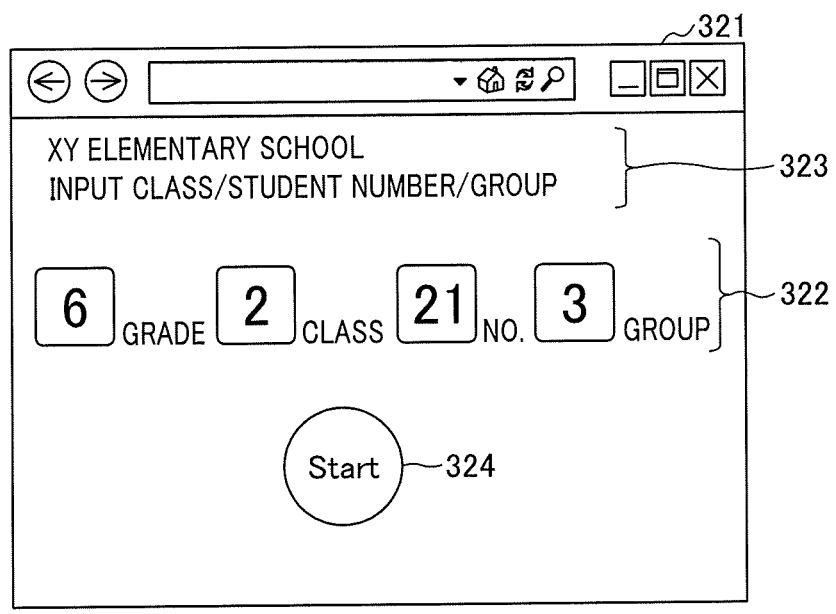
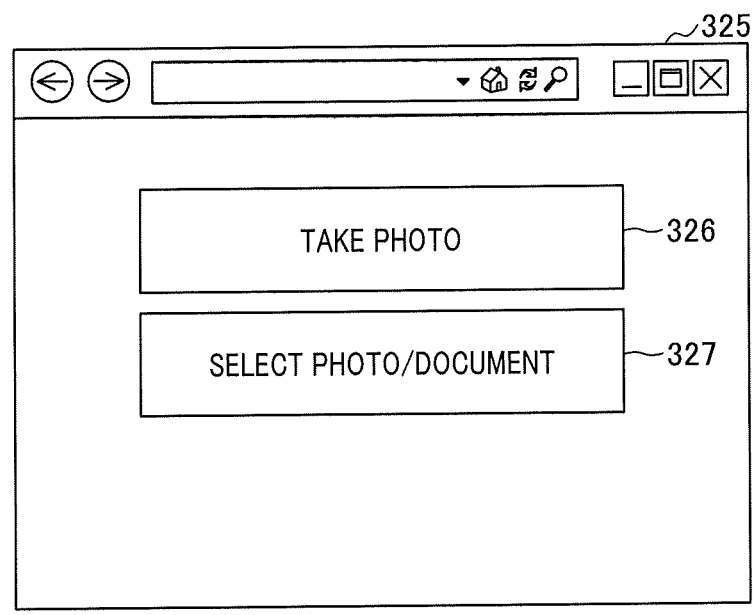

FIG. 35

| APPLICATION ID | APPLICATION TYPE | URL | CORRESPONDING BROWSER | |
|---|---|---|---|---|
| AP_PhotoShow | Out | https://daas.com/photoshow | APPARATUS-USE BROWSER, TERMINAL-USE BROWSER | |
| AP_Upload | In | https://daas.com/upload | TERMINAL-USE BROWSER | |
| AP_PhotoDoc | Out | https://daas.com/photoDoc | APPARATUS-USE BROWSER | |
| AP_EdPortal | - | https://daas.com/EdPortal | TERMINAL-USE BROWSER | |
| AP_StPortal | In | https://daas.com/StPortal | TERMINAL-USE BROWSER | |
| AP_StPhoto | In | https://daas.com/StPhoto | TERMINAL-USE BROWSER | |
| AP_Presen | In | https://daas.com/Presen | TERMINAL-USE BROWSER | 121A-1 |
| AP_PreEnd | In | https://daas.com/PreEnd | TERMINAL-USE BROWSER | 121A-2 |

| TENANT ID | USER ID | USEABLE APPLICATION | USEABLE BROWSER | IN-USE BROWSER |
|---|---|---|---|---|
| T001 | guest1 | AP_Presen, AP_PreEnd | BROWSER1 | BROWSER1 |
| | guest2 | AP_Presen, AP_PreEnd | BROWSER1 | BROWSER1 |
| | taro | AP_Upload, AP_PhotoShow | BROWSER1, BROWSER2 | BROWSER2 |

| REGISTRATION ID | IN-APPLICATION ID | OUT-APPLICATION ID | BROWSER ID |
|---|---|---|---|
| Tag_Ed | AP_EdPortal | – | – |
| Tag_St | AP_StPortal | – | – |
| *Tag_StPhotoCode* | *AP_StPhoto* | *AP_PhotoDoc* | – |
| Tag_StPhoto1 | AP_StPhoto | AP_PhotoDoc | BROWSER1 |
| Tag_StPhoto2 | AP_StPhoto | AP_PhotoDoc | BROWSER2 |
| Tag_StPhoto3 | AP_StPhoto | AP_PhotoDoc | BROWSER3 |
| *Tag_StDocCode* | *AP_StDoc* | *AP_PhotoDoc* | – |
| Tag_StDoc1 | AP_StDoc | AP_PhotoDoc | BROWSER1 |
| Tag_StDoc2 | AP_StDoc | AP_PhotoDoc | BROWSER2 |
| Tag_StDoc3 | AP_StDoc | AP_PhotoDoc | BROWSER3 |
| Tag_Presen | AP_Presen | AP_PhotoDoc | BROWSER1 |
| Tag_PreEnd | AP_PreEnd | AP_PhotoDoc | BROWSER1 |

124A

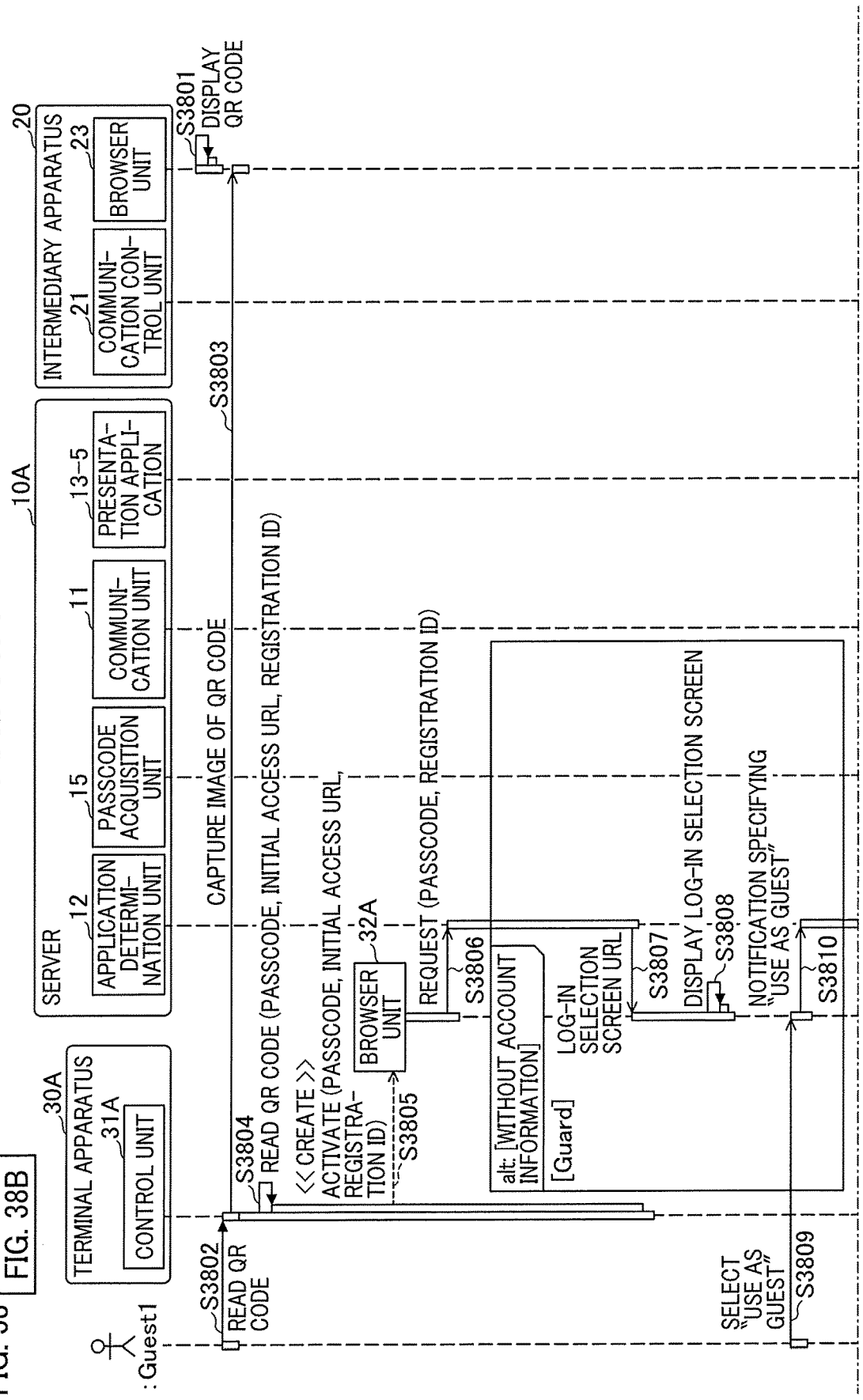

INFORMATION PROCESSING SYSTEM, INFORMATION PROCESSING APPARATUS, AND METHOD OF PROCESSING INFORMATION

CROSS-REFERENCE TO RELATED APPLICATIONS

This application claims priority pursuant to 35 U.S.C. § 119(a) to Japanese Patent Application Nos. 2018-186000, filed on Sep. 28, 2018, 2018-186001, filed on Sep. 28, 2018, and 2019-043071 filed on Mar. 8, 2019 in the Japan Patent Office, the disclosure of which are incorporated by reference herein in their entirety.

BACKGROUND

Technical Field

This disclosure relates to an information processing system, an information processing apparatus, and a method of processing information.

Background Art

Various devices and apparatuses are used in offices to perform various business operations. It is expected that efficiency of the various business operations can be improved by utilizing various devices and apparatuses. For example, by projecting or displaying data stored in a personal computer (PC) using an output apparatus such as projector and electronic whiteboard, information may be shared efficiently for the various business operations.

SUMMARY

As one aspect of the present invention, an information processing system including one or more intermediary apparatuses communicable with one or more output apparatuses, and an information processing apparatus communicable with the one or more intermediary apparatuses is devised. The information processing apparatus includes circuitry configured to receive, from a terminal, specific information and a process execution request input to the terminal, identify a specific intermediary apparatus associated with a specific output apparatus based on the specific information in accordance with the process execution request, and transmit the process execution request to the identified specific intermediary apparatus. The identified specific intermediary apparatus is configured to perform processing in accordance with the process execution request transmitted from the circuitry of the information processing apparatus to control the specific output apparatus.

As another aspect of the present invention, an information processing apparatus, communicable with one or more intermediary apparatuses communicable with one or more output apparatuses, is devised. The information processing apparatus includes circuitry configured to receive, from a terminal, specific information and a process execution request input to the terminal, identify a specific intermediary apparatus associated with a specific output apparatus based on the specific information in accordance with the process execution request, and transmit the process execution request to the identified specific intermediary apparatus.

As another aspect of the present invention, a method of processing information using an information processing apparatus, communicable with one or more intermediary apparatuses communicable with one or more output apparatuses, is devised. The method includes receiving, from a terminal, specific information and a process execution request input to the terminal, identifying a specific intermediary apparatus associated with a specific output apparatus based on the specific information in accordance with the process execution request, and transmitting the process execution request to the identified specific intermediary apparatus.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIG. 8 is an example of information stored in an apparatus information storage unit;

FIG. 9 is an example of information stored in a registration information storage unit;

FIG. 10 is an example of information stored in an application information storage unit;

FIG. 14 is an example of information stored in a user information storage unit according to the first embodiment;

FIG. 31 is an example of configuration of a document image data storage unit;

FIG. 32 is an example of a display style of a screen on a student terminal;

FIG. 35 is an example of an application information storage unit according to the second embodiment;

FIG. 36 is an example of a user information storage unit according to the second embodiment;

FIG. 37 is an example of a registration information storage unit according to the second embodiment;

FIGS. 38A and 38B (FIG. 38) are an example sequence diagram of processing when a terminal apparatus performs a presentation using an output apparatus according to the second embodiment;

The accompanying drawings are intended to depict embodiments of the present invention and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Figure 1:
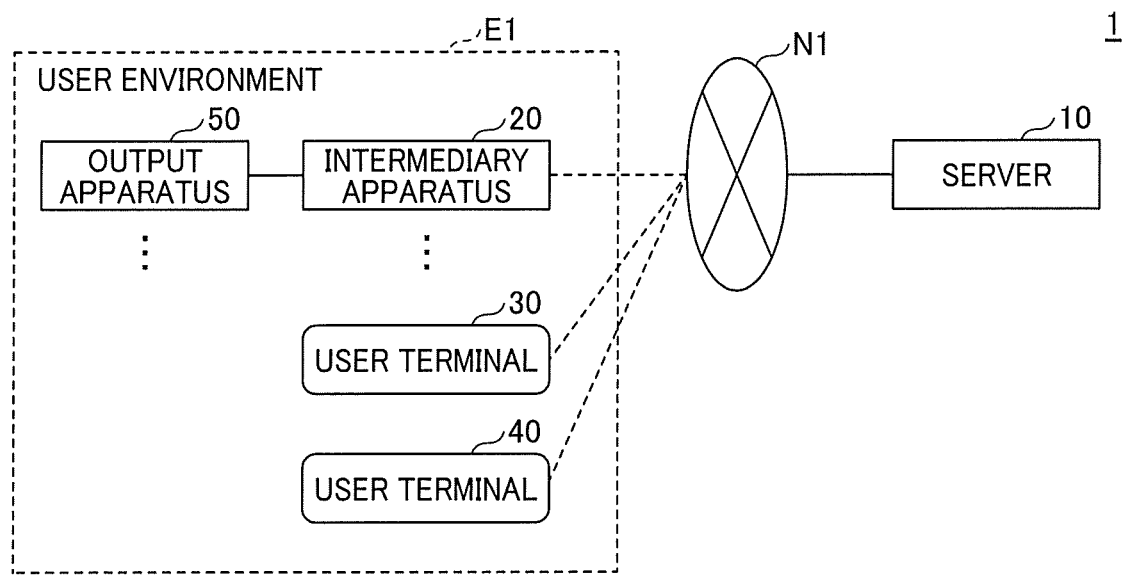
FIG. 1 is an example system configuration of an information processing system according to a first embodiment.

Hereinafter, a description is given of an information processing system 1 of a first embodiment with reference to FIG. 1. FIG. 1 is an example system configuration of the information processing system 1 according to the first embodiment. The information processing system 1 includes, for example, a server 10, and a user environment E1 including one or more apparatuses, such as user terminals 30 and 40, intermediary apparatuses 20, and output apparatuses 50

In the information processing system 1 of FIG. 1, the server 10 and the user environment E1 can communicate with each other via a network N1, such as a wide area network using the Internet. The network N1 can be any network that can be accessed within a pre-set range, such as an Intranet.

The user environment E1 indicates a system environment of an entity, such as a company, having one or more apparatuses, such as one or more output apparatus 50, and one or more intermediary apparatuses 20. The output apparatus 50 is an apparatus for displaying an input image using a display unit. The output apparatus 50 is, for example, a projector or an electronic whiteboard. In the user environment E1, each of the output apparatuses 50 is connected to each of the intermediary apparatuses 20 corresponding to each of the output apparatus 50. That is, the output apparatus 50 and the intermediary apparatus 20 are linked with each other one-to-one. The output apparatus 50 and the intermediary apparatus 20 can be connected via an interface compatible to a standard of image transmission, such as high definition multimedia interface (HDMI: registered trademark).

For example, the output apparatus 50 and the intermediary apparatus 20 can be connected using a cable, such as HDMI (registered trademark) cable, corresponding to the interface. Alternatively, a connector of the intermediary apparatus 20 compatible to the interface and a connector of the output apparatus 50 compatible to the interface can be connected directly. For example, when the connector of the intermediary apparatus 20 is inserted into the connector of the output apparatus 50, the intermediary apparatus 20 and the output apparatus 50 can be connected. Alternatively, the intermediary apparatus 20 and the output apparatus 50 can be connected using wireless communication, or connected via a network.

By connecting the output apparatus 50 and the intermediary apparatus 20 as described above, the intermediary apparatus 20 can transmit to-be-projected images to the output apparatus 50. Hereinafter, the output apparatus 50 may mean one or more projectors and the intermediary apparatus 20 may mean one or more intermediary apparatuses.

The intermediary apparatus 20 is connected to the network N1 via the local area network (LAN) set in the user environment E1. The intermediary apparatus 20 can be wirelessly connected to the network, such as LAN, set in the user environment E1. The intermediary apparatus 20, installed with a web browser, executes the web browser to perform various processing in response to receiving a process execution request of processing for image data, transmitted from the server 10, and controls an apparatus, such as the output apparatus 50, in which the processing result is output using the output apparatus 50.

Specifically, in the embodiment, the intermediary apparatus 20 causes the output apparatus 50 to perform outputting the image data, such as displaying of the image data. That is, the intermediary apparatus 20 mediates the output (e.g., display) of image data using the output apparatus 50 for the image data transmitted from the server 10. For example, a computer, such as an HDMI (registered trademark) dongle, a stick PC or the like can be used as the intermediary apparatus 20. In the following description, data including the image data and document data displayable on the output apparatus 50 or using the output apparatus 50 may be referred to as document image data. The document image data may be also referred to as the data or image data.

Each of the user terminals 30 and 40 is an information processing terminals to be used by each user in the user environment E1. For example, a smartphone, a tablet device, a PC, or a cellular phone can be used as the user terminals 30 and 40 which can be carried by each users. The user terminals 30 and 40 can be connected to the network N1 without using the LAN provided in the user environment E1 (e.g., via a mobile communication network). However, the user terminals 30 and 40 can be also connected to the network provided in the user environment E1.

In the embodiment, for example, when the user terminal 40 uploads the document image data to the server 10 via the network N1, and then a designation of specific document image data from the user terminal 30 is received, the designated specific document image data can be displayed using the output apparatus 50 via the intermediary apparatus 20.

The server 10 is one or more computers that execute a process for implementing the outputting of image data designated at the user terminal 30 or 40 using the output apparatus 50 based on a simple operation using the user terminal 30 or 40. Further, the server 10 can be disposed in the user environment E1.

Figure 2:
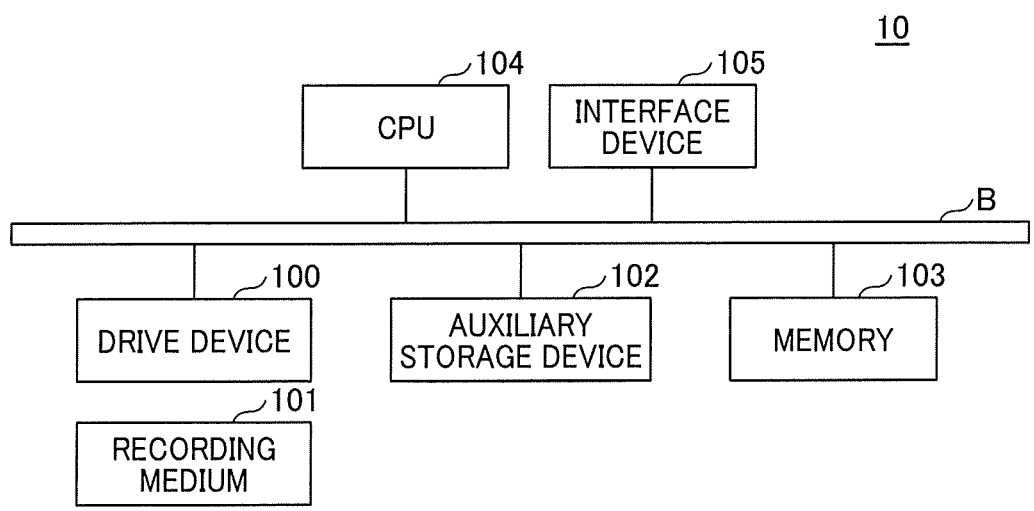
FIG. 2 is an example block diagram of a hardware configuration of a server according to the first embodiment.

FIG. 2 is an example block diagram of a hardware configuration of the server 10 according to the first embodiment. In this description, the server 10 is described as an example of information processing apparatus. As indicated in FIG. 2, the server 10 includes, for example, a drive device 100, an auxiliary storage device 102, a memory 103, a central processing unit (CPU) 104, and an interface device 105, which are connected to each other by a bus B.

One or more programs for implementing the processing in the server 10 can be provided by a recording medium 101 such as a compact disk read only memory (CD-ROM). When the recording medium 101 storing the program is set in the drive device 100, the program is installed on the auxiliary storage device 102 via the drive device 100 from the recording medium 101. However, the program installation does not necessarily need to be carried out by the recording medium 101, but may be downloaded from another computer via the network. The auxiliary storage device 102 stores the installed program and stores the necessary files and the like. In this description, the program may mean one or more programs.

The memory 103 reads and stores the program from the auxiliary storage device 102 when the program is instructed to be activated. The CPU 104 executes the function related to the server 10 in accordance with the program stored in the memory 103. The interface device 105 is used as an interface for connecting to the network.

Figure 3:
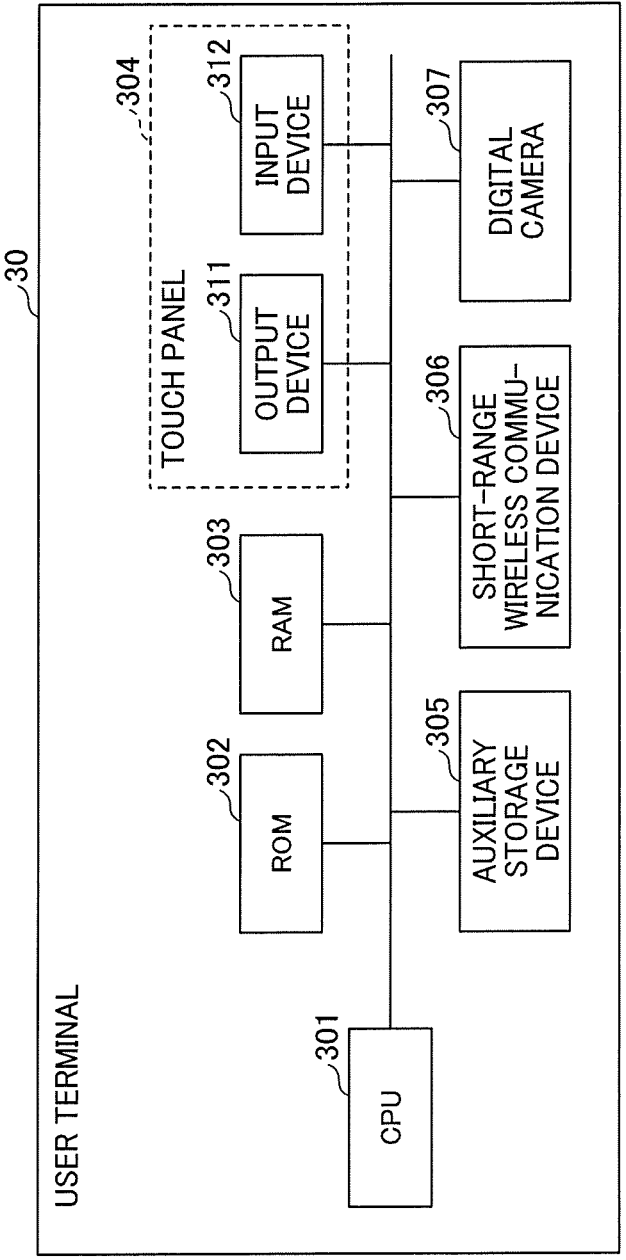
FIG. 3 is an example block diagram of a hardware configuration of a user terminal according to the first embodiment.

FIG. 3 is an example block diagram of a hardware configuration of the user terminals 30 and 40 according to the first embodiment. In the embodiment, the user terminals 30 and 40 employ the same hardware configuration, and in FIG. 3, the hardware configuration of the user terminal 30 will be described as an example of the user terminals 30 and 40.

As indicated in FIG. 3, the user terminal 30 includes, for example, a CPU 301, a ROM 302, a RAM 303, a touch panel 304, an auxiliary storage device 305, a short-range wireless communication device 306, and a digital camera 307.

The ROM 302 and the auxiliary storage device 305 store the program installed on the user terminal 30. The RAM 303 reads and stores the program from the ROM 302 or the auxiliary storage device 305 when the program is instructed to be activated. The CPU 301 executes the program stored in the RAM 303 to implement functions of the user terminal 30.

The touch panel 304 is an electronic component equipped with both an input function and a display function, and performs information display, and a reception of input from a user. As indicated in FIG. 3, the touch panel 304 includes, for example, an output device 311, and an input device 312.

The output device 311 is, for example, a liquid crystal display, and performs a display function of the touch panel 304. The input device 312 is an electronic component including a sensor that can detect a contact of a contacting object with the output device 311. The contacting object means an object that contacts a contact surface (face) of the touch panel 304. Examples of the contacting object include a user finger, a special pen, or a general pen. The touch panel 304 is not necessarily need to be provided. The user terminal 30 may be provided with the output device 311 and the input device 312 separately. Further, the output device 311 can be connected to the user terminal 30 externally. Further, the input device 312 is not limited to the sensor for detecting the contact. For example, the input device 312 includes electronic components, such as hardware keys, a keyboard, a mouse, and the like.

The short-range wireless communication device 306 is a hardware resource used for performing short-range wireless communication. In the first embodiment, the short-range wireless communication device 306 reads information stored in a near field communication (NFC) tag. That is, in the first embodiment, an NFC reader is suitable for the short-range wireless communication device 306. The digital camera 307 can be a general digital camera having an imaging function. The digital camera 307 can be embedded as an electronic component inside the user terminal 30, or the digital camera 307 can be connected to the user terminal 30 externally.

The user terminals 30 and 40 may not include, for example, the touch panel 304, the digital camera 307, or the short-range wireless communication device 306. The output device 311 of the user terminals 30 and 40 may be a display, and the input device 312 may be a keyboard or a pointing device.

Figure 4:
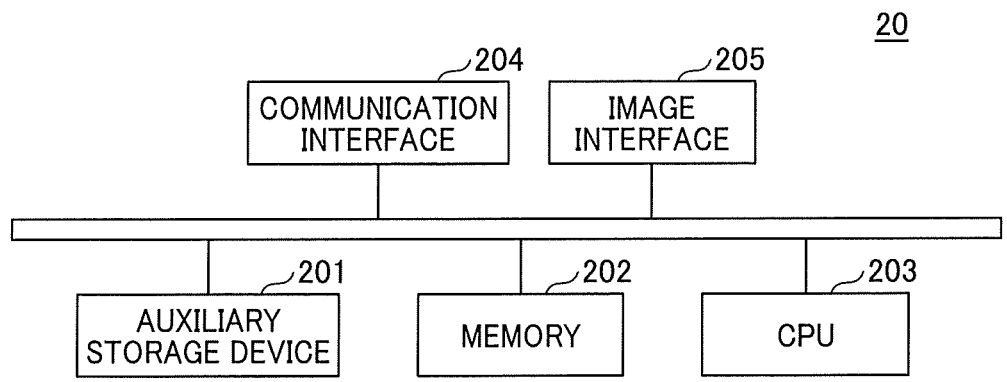
FIG. 4 is an example block diagram of a hardware configuration of an intermediary apparatus according to the first embodiment.

FIG. 4 is an example block diagram of a hardware configuration of the intermediary apparatus 20 according to the first embodiment. As indicated in FIG. 4, the intermediary apparatus 20 includes, for example, an auxiliary storage device 201, a memory 202, a CPU 203, a communication interface 204, and an image interface 205.

One or more programs for implementing various processing in the intermediary apparatus 20 is installed on the auxiliary storage device 201. Hereinafter, the program may mean one or more programs. The auxiliary storage device 201 stores the installed program, and necessary files and data.

The memory 202 reads and stores the program from the auxiliary storage device 201 when the program is instructed to activate. The CPU 203 executes the program stored in the memory 202 to implement functions of the intermediary apparatus 20. The communication interface 204 is a physical interface for connecting to the network. The image interface 205 is a physical interface for transmitting image data to the output apparatus 50.

Figure 5:
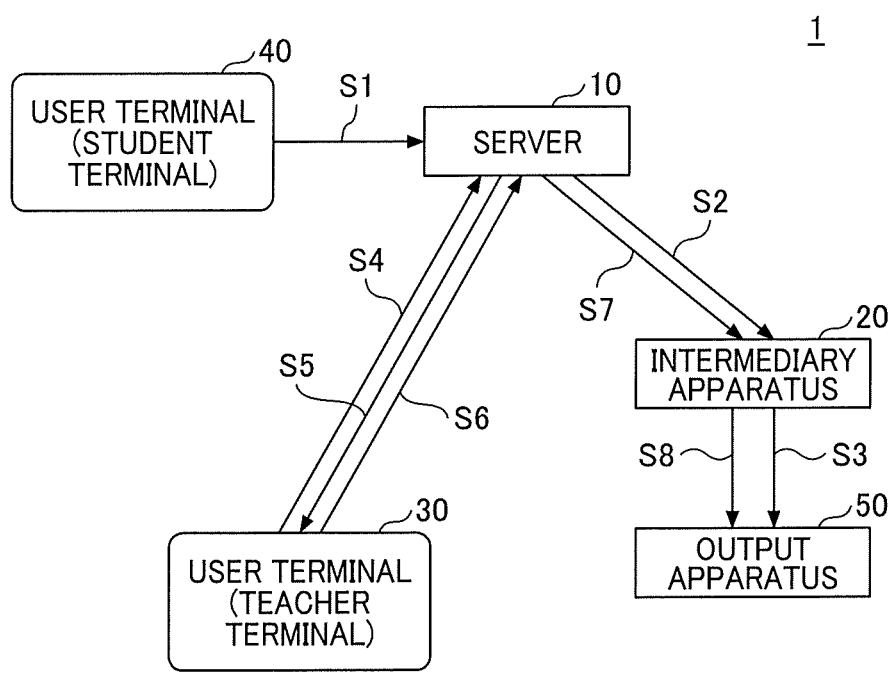
FIG. 5 is an example diagram of a scheme of the information processing system of according to the first embodiment.

FIG. 5 is an example diagram of a scheme of the information processing system of the first embodiment. In FIG. 5, the information processing system 1 is used in an educational field such as a school, in which the user terminal 30 is mainly used by a teacher and the user terminal 40 is mainly used by a student.

In the following description for the first embodiment, the user terminal 30 may be also referred to as the teacher terminal 30 while the user terminal 40 may be also referred to as the student terminal 40.

The output apparatus 50 is, for example, a large display device or the like. Specifically, the output apparatus 50 is, for example, an electronic whiteboard to display documents and images to be viewed by one or more students and teachers.

In the information processing system 1, data, such as document image data can be uploaded to the server 10 from the student terminal 40 (step S1). When the document image data is uploaded from the student terminal 40 to the server 10, the server 10 stores the document image data in a folder corresponding to a grade and a class of a specific student who has used the student terminal 40 to upload the document image data.

Then, the server 10 generates specific information (identification information) to be used for associating the teacher terminal 30, which issues a display request of the document image data, and the output apparatus 50, and notifies the specific information (identification information) to the intermediary apparatus 20 (step S2).

Then, the intermediary apparatus 20 displays the notified specific information (identification information) using the output apparatus 50 (step S3).

At this stage, the server 10 retains apparatus information associating the specific information (identification information) and the output apparatus 50 that displays the specific information (identification information). In this description, the specific information (identification information) represents given information used for associating the teacher terminal 30 that has accessed to the server 10, and the output apparatus 50.

In this configuration used in one or more embodiments, by using the specific information (identification information), it can be confirmed that a user operating the teacher terminal 30 exists near the output apparatus 50, with which unauthorized access from an external apparatus or device can be prevented. The specific information (identification information) can be any allocated or assigned information used for specifying or identifying the output apparatus 50. For example, the specific information (identification information) can be any information, such as number, character, symbol, and figure, or combination of these. Further, the specific information (identification information) can be image data, such as QR code (registered trademark). Further, the specific information (identification information) can be changed by updating the specific information (identification information) over time, such as at a pre-set time interval. The details of specific information (identification information) will be described later.

Then, when the server 10 receives a service request from the teacher terminal 30 (step S4), the server 10 instructs the teacher terminal 30 to display an input screen for inputting the specific information (identification information) on the teacher terminal 30 (step S5).

When the specific information (identification information) displayed by the output apparatus 50 is input into the input screen displayed on the teacher terminal 30 by the user (e.g., teacher) of the teacher terminal 30, the teacher terminal 30 transmits the input specific information (identification information) to the server 10 (step S6). Further, the specific information (identification information) can be input to the teacher terminal 30 by the user manually. Further, if the specific information (identification information) is image data, the user can capture the image data using the digital camera 307 of the teacher terminal 30 and then input the image data.

In response to receiving the specific information (identification information) (step S6), the server 10 refers to the apparatus information associating the specific information (identification information) and the output apparatus 50 to identify the concerned output apparatus 50 associated with the specific information (identification information), and transmits a process execution request for implementing the concerned service to the intermediary apparatus 20 that controls the concerned output apparatus 50 (step S7).

Then, the intermediary apparatus 20 causes the concerned output apparatus 50 to execute specific processing corresponding to the process execution request (step S8).

Specifically, for example, it can be assumed that the server 10 receives, from the teacher terminal 30, a display request of document image data uploaded to the server 10.

In the above described case, the server 10 causes the teacher terminal 30 to display the input screen of the specific information (identification information), and when the specific information (identification information) is input into the input screen displayed on the teacher terminal 30, the server 10 causes the teacher terminal 30 to display a screen for designating the document image data.

When the document image data is designated at the teacher terminal 30, the server 10 transmits a display request of the designated document image data to the intermediary apparatus 20 that controls the concerned output apparatus 50 associated with the specific information (identification information). In response to receiving the display request instruction from the server 10, the intermediary apparatus 20 causes the concerned output apparatus 50 to display the document image data.

In the above described configuration, the teacher, who is the user of the teacher terminal 30, can use the concerned output apparatus 50 to display the document image data uploaded to the server 10 by simply entering or inputting the specific information (identification information) and designating the document image data. Therefore, as to the one or more embodiments, when the teacher wants to display the desired document image data using the concerned output apparatus 50, the teacher is not required to directly connect the teacher terminal 30 and the concerned output apparatus 50, with which the desired document image data can be displayed using the concerned output apparatus 50 installed at any location.

In the one or more embodiments, it is assumed that the teacher terminal 30 alone performs the processing using the output apparatus 50 via the intermediary apparatus 20, and the student terminal 40 simply uploads the document image data to the server 10. In the following description, the specific information (identification information) is described as, for example, a passcode. As described above, the passcode is just one example of the specific information (identification information), and the passcode to be described below can be replaced with another example described above.

Figure 6:
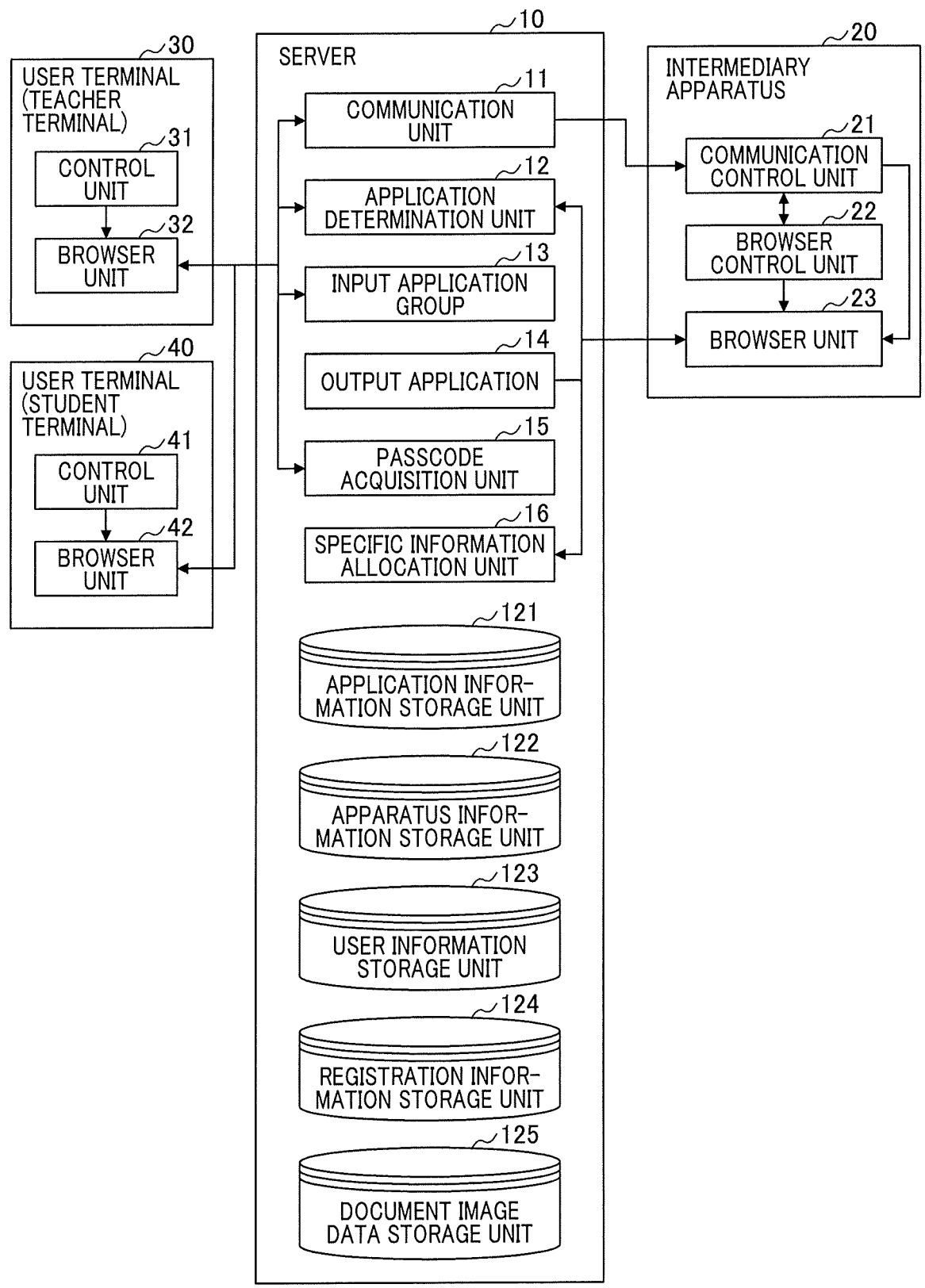
FIG. 6 is an example block diagram of a functional configuration of each apparatus in the information processing system according to the first embodiment.

FIG. 6 is an example block diagram of a functional configuration of each apparatus in the information processing system 1 according to the first embodiment. As indicated in FIG. 6, the teacher terminal 30 includes, for example, a control unit 31 and a browser unit 32. These units can be implemented by executing one or more programs installed on the teacher terminal 30 using the CPU 301. The control unit 31 can implemented by, for example, an operating system, or can be implemented by a software program, such as an application.

The control unit 31 activates the browser unit 32 in response to receiving a user operation to the teacher terminal 30. The browser unit 32 is, for example, a general web browser, and performs processing in accordance with hypertext markup language (HTML) data and script, such as JavaScript (registered trademark) or the like. Further, in response to the activation of the browser unit 32, the browser unit 32 transmits an initial access universal resource locator (URL) to the server 10.

At this stage, the browser unit 32 also transmits registration identification (ID), which is assigned to the initial access URL as optional information, to the server 10 along with the initial access URL. The registration ID is identification information identifying a specific service, and is associated with a specific application that implements the specific service in advance.

Further, in accordance with a redirect request received from the server 10 that responds to receiving the initial access URL, the browser unit 32 accesses the specific application associated with the registration ID, among applications installed on the server 10. The redirect request is a response from the server 10 that responds to receiving the initial access URL.

The browser unit 32 acquires data (e.g., HTML data and script) indicating a process execution request of processing to the teacher terminal 30 from the accessed specific application.

The initial access URL indicates a URL to be accessed at first when the teacher terminal 30 accesses the server 10.

As indicated in FIG. 6, the student terminal 40 includes, for example, a control unit 41 (operating system unit) and a browser unit 42. These units can be implemented by executing one or more programs installed on the student terminal 40 using the CPU 301 (FIG. 3).

The control unit 41 activates the browser unit 42 in response to receiving a user operation to the student terminal 40. The browser unit 42 is, for example, a general web browser, and performs a process of selecting the document image data to be uploaded to the server 10.

As indicated in FIG. 6, the intermediary apparatus 20 includes, for example, a communication control unit 21, a browser control unit 22, and a browser unit 23. These units can be implemented by executing one or more programs installed on the intermediary apparatus 20 using the CPU 203.

The communication control unit 21 connects a bi-directional communication path with the communication unit 11 of the server 10 (i.e., establishing a communication session), and functions as an endpoint of the intermediary apparatus 20 on the communication path (communication session). By performing the communication via the communication path (communication session), the state of the intermediary apparatus 20 can be notified to the server 10, and the intermediary apparatus 20 can receive a notification that the document image data to be displayed using the output apparatus 50 has been input to the server 10, from the server 10. The input of the document image data to the server 10 indicates that the document image data is uploaded from the teacher terminal 30 or the student terminal 40 to the server 10.

The browser control unit 22 activates the browser unit 23 using, for example, a kiosk mode. The kiosk mode is a mode that restricts the usage of the intermediary apparatus 20 to displaying of web pages alone. The kiosk mode is just one example. Any mode that can display web pages can be used.

The browser unit 23 is, for example, a general web browser, and performs processing in accordance with HTML data and script.

The browser unit 23 accesses the initial access URL in response to the activation. At this stage, the identification information of the browser unit 23 (hereinafter, "browser ID") is assigned to the initial access URL as optional information.

Further, in accordance with a redirect request received from the server 10, which is transmitted from the server 10 in response to the accessing to the initial access URL, the browser unit 23 accesses a specific application associated with the browser ID, among applications installed on the server 10. Then, the browser unit 23 acquires data (e.g., HTML data, script) indicating a process execution request of processing to the intermediary apparatus 20 from the specific application.

As indicated in FIG. 6, the server 10 includes, for example, a communication unit 11, an application determination unit 12, an input application group 13, an output application 14, a passcode acquisition unit 15, and a specific information allocation unit 16. These units can be implemented by executing one or more programs installed on the server 10 using the CPU 104.

Further, as indicated in FIG. 6, the server 10 includes an application information storage unit 121, an apparatus information storage unit 122, a user information storage unit 123, a registration information storage unit 124, and a document image data storage unit 125. Each of these storage units can be implemented by, for example, the auxiliary storage device 102 or a storage device that can be connected to the server 10 via a network.

In response to a request of document image data to be used for a specific service associated with the registration ID received from an output destination, the communication unit 11 transmits the requested document image data to the output destination, among the document image data stored in the document image data storage unit 125. In the embodiment, the output destination is, for example, the intermediary apparatus 20.

The application determination unit 12 determines a specific application corresponding to the initial access URL. In response to the access to the initial access URL, the application determination unit 12 refers to the registration information storage unit 124 to determine a specific application corresponding to the optional information (e.g., registration ID or browser ID) assigned to the initial access URL.

After determining the specific application corresponding to the optional information, the application determination unit 12 transmits a response including a redirect request including a URL of the determined specific application to an access requesting source that has accessed the initial access URL of the server 10, such as the teacher terminal 30.

In the embodiment, as to the access from the teacher terminal 30, which can be used as the input source of the document image data, the application determination unit 12 determines a URL of an application included in the input application group 13 as the specific application corresponding to the registration ID. Further, as to the access from the intermediate apparatus 20, used as the output destination of the document image data, the application determination unit 12 determines a URL of the output application 14 as the specific application corresponding to the browser ID.

The input application group 13 and the output application 14 are an example of applications installed on the server 10.

The input application group 13 is an application group including applications used for executing processing corresponding to respective specific usages, and each application transmits HTML data and script to execute processing corresponding to the specific usage, to the teacher terminal 30.

The input application group 13 includes, for example, an application to cause the teacher terminal 30 to execute a process of displaying a menu of a portal screen used by a teacher. Further, the input application group 13 includes, for example, an application to cause the student terminal 40 to execute a process of displaying a menu of a portal screen used by a student.

The output application 14 is an application for causing the intermediary apparatus 20 to execute an acquisition (e.g., downloading) and rendering of the document image data stored in the document image data storage unit 125. Specifically, the output application 14 transmits HTML data and script to the intermediary apparatus 20 to cause the intermediary apparatus 20 to perform the acquisition and rendering.

When a request for processing is input at the teacher terminal 30, the passcode acquisition unit 15 causes the teacher terminal 30 to access a URL indicating an input screen of passcode. In other words, the passcode acquisition unit 15 corresponds to a URL indicating the input screen of passcode.

Further, the passcode acquisition unit 15 specifies or identifies a browser to be used as the output destination of a processing result of processing requested by the teacher terminal 30 based on the passcode input at the teacher terminal 30, and the application that performs the requested processing.

In other words, the passcode acquisition unit 15 acquires the passcode input at the teacher terminal 30, and the process execution request associated with the passcode, and then specifies or identifies the intermediary apparatus 20 to be associated with the teacher terminal 30 based on the passcode and the process execution request. Therefore, the passcode acquisition unit 15 can be use as the identification unit.

The specific information allocation unit 16 generates a passcode, and causes the output apparatus 50 to display the passcode via the intermediary apparatus 20. The specific information allocation unit 16 generates the passcode in a way such that each of passcodes displayed using the output apparatus 50 becomes different with each other. The generation of passcode by the specific information allocation unit 16 will be described later.

The application information storage unit 121 stores information (e.g., URL) related to each application installed on the server 10. In the embodiment, the application information storage unit 121 stores information related to each application installed on the server 10, such as the input application group 13 and the output application 14.

The user information storage unit 123 stores identification information of one or more users who can use each application installed on the server 10.

The apparatus information storage unit 122 stores information indicating the state of the intermediary apparatus 20 for each one of the intermediary apparatuses 20 disposed in the user environment E1.

The registration information storage unit 124 stores identification information identifying a specific application, which executes the input processing of document image data, identification information identifying a specific application, which executes the output processing of the document image data, and identification information identifying the browser unit 23 of the intermediary apparatus 20 used as the output destination of the document image data for each of the registration IDs.

The document image data storage unit 125 stores the document image data and information related to the document image data. The information related to the document image data includes, for example, information identifying a student who has registered the document image data, and information indicating a subject of class when the document image data is acquired. The details of the above described each storage unit will be described later.

Figure 7:
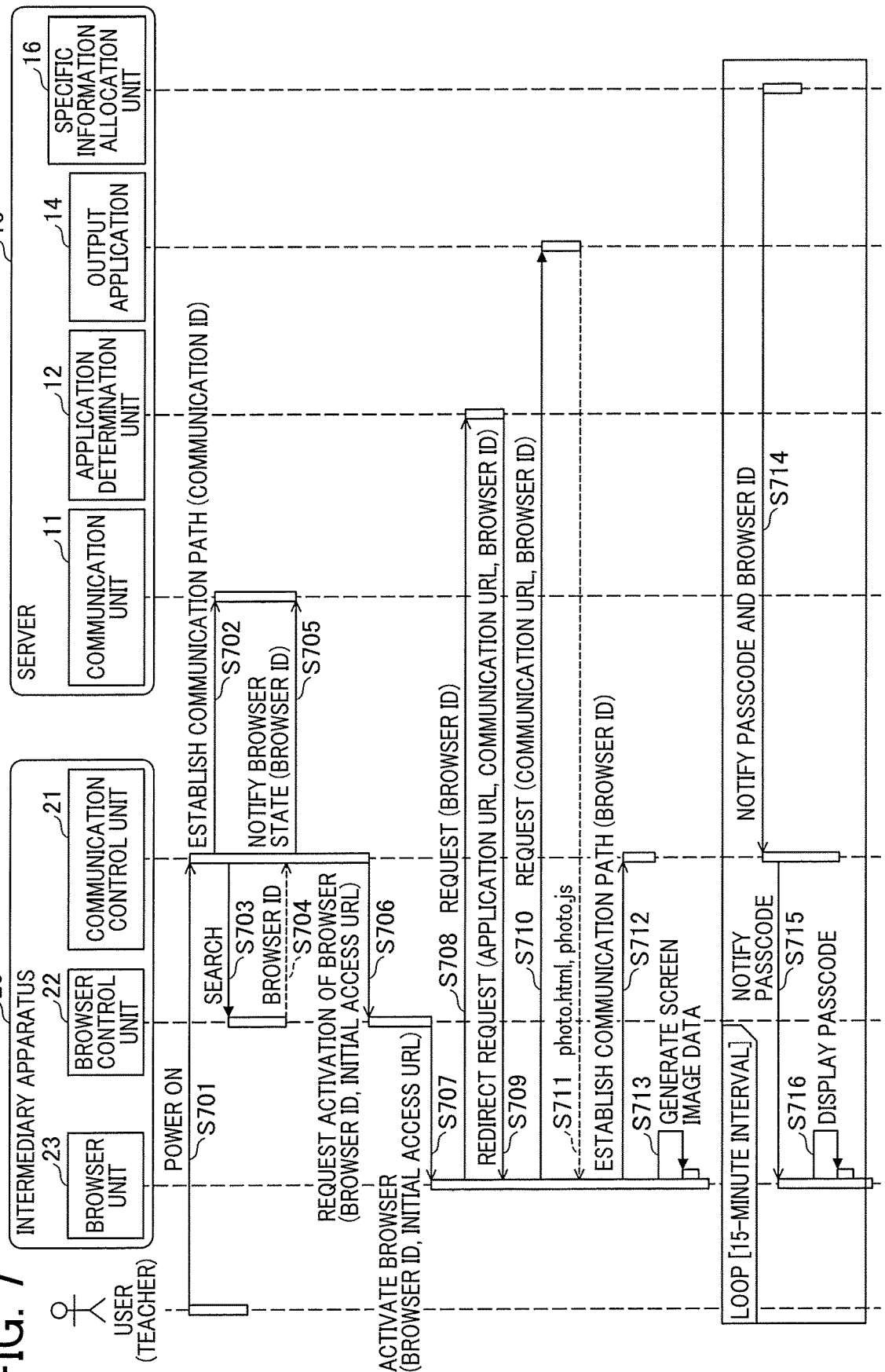
FIG. 7 is an example sequence diagram of processing, which is performed in response to an activation of an intermediary apparatus.

Hereinafter, a description is given of processing performable in the information processing system 1 with reference to FIG. 7. FIG. 7 is an example sequence diagram of processing, which is performed in response to an activation of the intermediary apparatus 20.

When a user turns on the power supply to the intermediary apparatus 20 (step S701), the communication control unit 21 of the intermediary apparatus 20 establishes a communication path with the communication unit 11 of the server 10 to receive a request from the communication unit 11 of the server 10 asynchronously (step S702). At this stage, the communication control unit 21 notifies a communication ID, which is the identification information of the communication control unit 21, to the communication unit 11. Then, the communication unit 11 updates the apparatus information storage unit 122 based on the communication ID (hereinafter, "target communication ID") notified from the communication control unit 21.

FIG. 8 is an example of information stored in the apparatus information storage unit 122. As indicated in FIG. 8, the apparatus information storage unit 122 stores information items, for example, tenant ID, communication ID, address information, state information, browser ID, browser state, and passcode in association with each other.

The tenant ID represents identification information of a subscriber (e.g., tenant) having a service-use contract provided by the server 10. For example, the user environment E1 can become one tenant.

The communication ID represents identification information of the communication control unit 21 of each intermediary apparatus 20 disposed in the tenant identified or specified by the tenant ID. If the intermediary apparatus 20 includes only one communication control unit 21, the communication ID can be used as the identification information identifying the intermediary apparatus 20.

The address information represents a local internet protocol (IP) address of the intermediary apparatus 20.

The state information represents information indicating whether or not the communication control unit 21, identified or specified by the communication ID, is being connected to the server 10, such as whether the communication control unit 21 has established the communication path with the server 10 ("being connected") or not ("not connected").

The browser ID represents identification information of the browser unit 23 corresponding to the communication control unit 21 identified or specified by the communication ID. In this description, the browser ID represents identification information of the browser unit 23 included in the same intermediary apparatus 20 including the communication control unit 21 identified or specified by the communication ID.

The browser state represents information indicating the activation state of the browser unit 23 identified or specified by the browser ID. For example, if the target communication ID notified to the communication unit 11 is "Eg001-01," the browser state corresponding to the target communication ID in the apparatus information storage unit 122 is changed to "power ON" or "power saving" as indicated in FIG. 8.

The passcode is generated by the specific information allocation unit 16 when the communication path with the intermediary apparatus 20 is established, and the generated passcode is associated with the browser ID (the intermediary apparatus 20). If a plurality of browser IDs is associated with the communication ID, the passcode can be generated for each of the browser IDs.

After step S702, the communication control unit 21 searches the browser control unit 22 to obtain or acquire the browser ID using, for example, simple network management protocol (SNMP) (step S703).

Then, the communication control unit 21 obtains or acquires the browser ID, which is the identification information of the browser unit 23 that is a control target of the browser control unit 22, from the searched browser control unit 22 (step S704).

In the embodiment, the intermediary apparatus 20 includes the communication control unit 21 and the browser control unit 22. In this configuration, the communication control unit 21 included in one intermediary apparatus 20 can search the browser control unit 22 using the simple network management protocol (SNMP) to enable the communication control unit 21 included in one intermediary apparatus 20 to communicate with the browser control unit 22 included in another intermediary apparatus 20 so that a plurality of the browser control units 22 and the browser units 23 can be used. Therefore, the searching of the browser control unit 22 is not necessarily required, but the acquiring destination (browser control unit 22) that the communication control unit 21 is to acquire the browser ID can be pre-set in advance.

After step S704, the communication control unit 21 transmits, to the communication unit 11, a notification that the state of the browser unit 23 corresponding to the acquired browser ID (e.g., the browser unit 23 of the intermediary apparatus 20) becomes ready for use by designating the browser ID (hereinafter, "target browser ID") of the browser unit 23 (step S705).

In response to receiving the notification from the communication control unit 21 (step S705), the communication unit 11 updates the apparatus information storage unit 122 (FIG. 8) based on the target browser ID designated in the notification. Specifically, a value of the browser state corresponding to the target browser ID is updated from "power OFF" to "power ON" in the apparatus information storage unit 122.

Then, the communication control unit 21 designates the target browser ID and the initial access URL to request the browser control unit 22 to activate the browser unit 23 identified or specified by the target browser ID (step S706). As described above, the initial access URL corresponds to the URL to be accessed by the browser unit 23 at first, and is pre-set in the browser control unit 22 in advance.

In response to receiving the request from the communication control unit 21 (step S706), the browser control unit 22 activates the browser unit 23 identified or specified by the target browser ID using the kiosk mode (step S707). At this stage, the browser control unit 22 inputs the initial access URL to the browser unit 23.

Then, in response to activating the browser unit 23 using the kiosk mode (step S707), the browser unit 23 transmits an HTTP request to the input initial access URL, which is the application determination unit 12 of the server 10 (step S708). The HTTP request includes the target browser ID.

In response to receiving the HTTP request from the browser unit 23 (step S708), the application determination unit 12 of the server 10 transmits a response (HTTP response) including a redirect request to the browser unit 23 (step S709).

The redirect request includes a URL of an application (application URL) associated with the browser ID as a redirect destination. The redirect request further includes the target browser ID, included in the communication URL and the HTTP request, as the notification information to the redirect destination. The communication URL corresponds to the URL of the communication control unit 21.

At this stage, the application determination unit 12 refers to the registration information storage unit 124 (FIG. 9) and the application information storage unit 121 (FIG. 10) to identify or specify the URL of a specific application associated with the target browser ID.

FIG. 9 is an example of information stored in the registration information storage unit 124. As indicated in FIG. 9, the registration information storage unit 124 stores information items, for example, registration ID, In-application ID, Out-application ID, and browser ID, in which values of "registration ID" are associated and stored with values of other information items.

The In-application ID is an ID of an application (hereinafter, "application ID") that controls the input of document image data for the service corresponding to the registration ID.

The Out-application ID is an application ID of an application that controls the output of document image data for a specific service corresponding to the registration ID.

In the embodiment, an application indicated by the In-application ID associated with the registration ID in the registration information storage unit 124 is one of applications included in the input application group 13. Further, an application indicated by the Out-application ID associated with the registration ID in the registration information storage unit 124 is the output application 14.

For example, the registration ID of "Tag_Ed" is associated with the In-application ID of "AP_EdPortal" but not associated with the Out-application ID. Therefore, it can be understood that a service corresponding to the registration ID of "Tag_Ed" provides a service related to the controlling of the input of document image data. The In-application ID of "AP_EdPortal" indicates an application ID of an application that executes processing to display a menu of a portal screen for a teacher, among the applications included in the input application group 13.

Further, the registration ID of "Tag_St" is associated with the In-application ID of "AP_StPortal" but not associated with the Out-application ID. Therefore, it can be understood that a service corresponding to the registration ID of "Tag_St" provides a service related to the controlling of the input of document image data. In other words, in a case of the student terminal 40 that is provided only the service corresponding to the registration ID of "Tag_St," the student terminal 40 does not have a function of transmitting the process execution request of processing to the intermediary apparatus 20, to the server 10.

Thus, in the embodiment, by limiting the service to be provided to the student terminal 40, the output of the document image data via the intermediary apparatus 20 from the student terminal 40 can be restricted. Therefore, a situation such as unintentional document image data is output to the output apparatus 50 due to an operation error at the student terminal 40 can be reduced or prevented, with which the confidentiality of document image data stored in the server 10 can be improved.

Further, in an example case of FIG. 9, the In-application ID of "AP_StPortal" indicates an application ID of an application that executes the processing to display the menu of the portal screen for the student, among the applications included in the input application group 13.

Further, in an example case of FIG. 9, the registration ID of "Tag_StPhotoCode" is associated with the In-application ID of "AP_StPhoto" and the Out-application ID "AP_PhotoDoc" but is not associated with the browser ID.

In the embodiment, the registration ID, the In-application ID and the Out-application ID are associated with each other as above described. In a state that the browser ID is not associated with the registration ID, the In-application ID and the Out-application ID, a service is determined without determining the browser ID. In such a case, the service and the browser ID are associated with each other based on the passcode.

In the following description, in the registration information storage unit 124, information including the value of "registration ID" and the values of the other information items is referred to as "tag information."

FIG. 10 is an example of information stored in the application information storage unit 121. As indicated in FIG. 10, the application information storage unit 121 stores information items, for example, application ID, application type, URL, and corresponding browser for each application installed on the server 10.

The application type represents a type of an application identified or specified by the application ID based on a relationship with document image data. "In" indicates that the application type is an application that controls the input of document image data (corresponding to the above-described In-application ID). "Out" indicates that the application type is an application that controls the output of document image data (corresponding to the above-described Out-application ID). The URL corresponds to the URL of the application identified or specified by the application ID.

The corresponding browser indicates a type of browser that activates the application identified or specified by the application ID. In an example case of FIG. 10, the browser type includes a terminal-use browser indicating a browser unit of the teacher terminal 30 and the student terminal 40, and an apparatus-use browser indicating the browser unit 23 of the intermediary apparatus 20.

The application determination unit 12 refers to the registration information storage unit 124 (FIG. 9) to identify or specify an Out-application ID associated with the target browser ID, and then refers to the application information storage unit 121 (FIG. 10) to identify or specify a URL associated with the Out-application ID. In one example case, it is assumed that the target browser ID is "BROWSER1," in which a URL (hereinafter, output application URL) of an application (i.e., output application 14) having the application ID of "AP_PhotoDoc" is identified.

Further, the application determination unit 12 automatically generates the communication URL of the communication control unit 21 identified or specified by the target communication ID based on the address information associated with the target browser ID stored in the apparatus information storage unit 122 (FIG. 8).

Then, in accordance with the redirect request (step S709), the browser unit 23 transmits (redirects) an HTTP request to the output application URL used as the redirect destination that is the output application 14 (step S710). The HTTP request includes the communication URL and the browser ID included in the redirect request.

In response to receiving the HTTP request from the browser unit 23 (step S710), the output application 14 transmits a response including a script of "photo.js" and display data of "photo.html" to the browser unit 23 (step S711), in which the script of "photo.js" is used to cause the browser unit 23 connect with the communication URL included in the HTTP request, and the display data of "photo.html" is used to cause the browser unit 23 to render a user interface used for outputting document image data (e.g., slide show). The script and display data are examples of data indicating the request for executing the processing to the intermediary apparatus 20. For example, the script can be another type of program, and the display data can be another type of data.

In response to receiving the response from the output application 14 (step S711), the browser unit 23 executes the script of "photo.js" included in the response to establish a communication path with the communication control unit 21 identified by the communication URL (step S712). The communication path is used for transmitting the notification, received by the communication control unit 21 from the server 10, to the browser unit 23. The communication path can use, for example, web socket.

Then, the browser unit 23 generates or renders screen image data (hereinafter, "display screen") on a pre-set region of the memory 103 (e.g., video memory) based on the display data of "photo.html" included in the response (step S713). For example, the display screen is a screen that serves as a frame screen, which is used to set the document image data distributed from the server 10. The rendering content (i.e., display screen) generated by the browser unit 23 is output to the output apparatus 50 via an interface such as HDMI (registered trademark), and then the rendering content (i.e., display screen) can be output (displayed) using the output apparatus 50.

Then, the server 10 uses the specific information allocation unit 16 to generate and allocate passcodes that do not overlap each other for a pre-set period of time for a browser ID group associated with the tenant ID, and then distributes a passcode notification associating the browser ID and the corresponding passcode to the communication control unit 21 of the intermediary apparatus 20 at a pre-set constant interval (step S714). At this stage, the specific information allocation unit 16 stores each of the generated passcodes in the apparatus information storage unit 122 (FIG. 8) in association with each corresponding browser ID.

The pre-set period of time is, for example, a few days, and the pre-set constant interval is, for example, several minutes (e.g., 15 minutes).

In response to receiving the passcode notification (step S714), the communication control unit 21 notifies the passcode to the browser unit 23 specified or identified by the browser ID associated with the passcode (step S715).

Then, the browser unit 23 displays the passcode on a portion of a display screen of the output apparatus 50 (step S716).

In an example case of FIG. 8, the communication ID of "Eg001-01" is associated with two browser IDs of "BROWSER1" and "BROWSER2." In this example case, the passcode corresponding to the browser ID of "BROWSER1" whose activation state is "power on" is displayed using the output apparatus 50 under the control of the intermediary apparatus 20.

Figure 11:
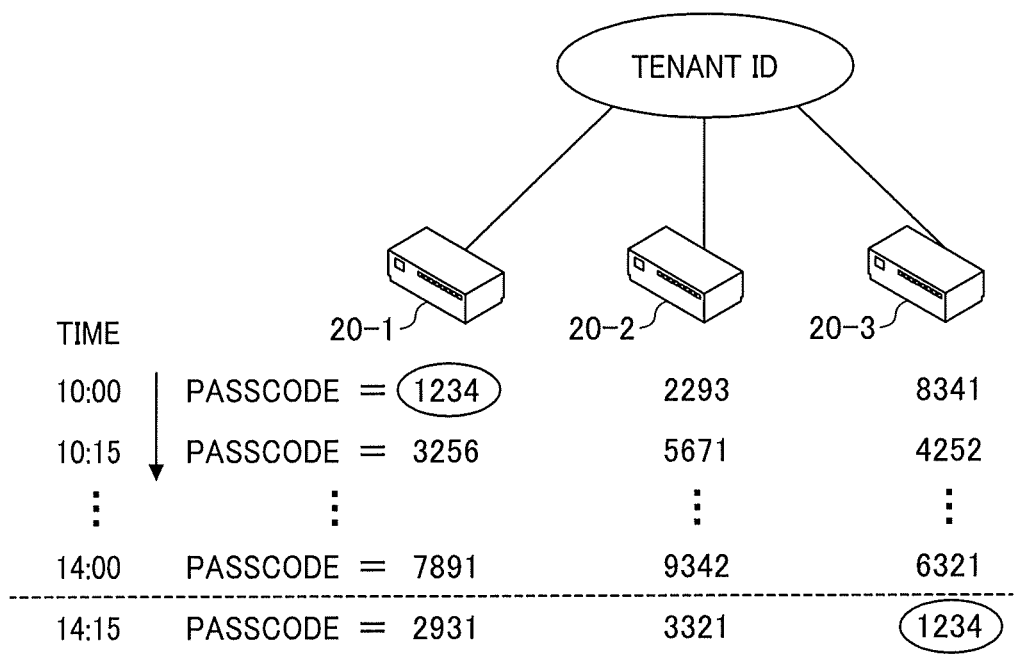
FIG. 11 is an example diagram illustrating a process of generating and allocating one or more passcodes.

Hereinafter, a description is given of generation and allocation of passcodes using the specific information allocation unit 16 with reference to FIG. 11. FIG. 11 is an example diagram illustrating a process of generating and allocating one or more passcodes.

The passcode is, for example, a string of numbers, such as a four-digit number. The specific information allocation unit 16 generates a passcode for each browser ID (intermediary apparatus 20) associated with the tenant ID. Specifically, the specific information allocation unit 16 generates randomly, for example, a random four-digit number, and allocates the generated random four-digit number to the intermediary apparatus 20 as the passcode.

Further, in a case having a plurality of the intermediary apparatuses 20 associated with one tenant ID (e.g., when a plurality of the intermediary apparatuses 20 are located in the user environment E1), the specific information allocation unit 16 generates a plurality of passcodes and allocates the generated passcodes to each one of the intermediary apparatuses 20 without allocating the same passcode to the two or more intermediary apparatuses 20. Further, the specific information allocation unit 16 periodically changes the passcode allocated to each of the intermediary apparatuses 20.

In an example case of FIG. 11, there intermediary apparatuses 20-1, 20-2 and 20-3 are located in one tenant ID.

In this example case, the specific information allocation unit 16 allocates, for example, passcodes of "1234," "2293" and "8341" to the respective intermediary apparatuses 20 for 15 minutes from 10:00. Further, the specific information allocation unit 16 allocates another passcodes of "3256," "5671" and "4252" to the respective intermediary apparatuses 20 for 15 minutes from 10:15.

As to the above described configuration of the embodiment, different passcodes can be allocated for each one of the intermediary apparatuses 20, and further, the passcode allocated to the intermediary apparatus 20 can be changed periodically, with which unauthorized access from a terminal, other than the teacher terminal 30 that is used to input the passcode displayed on the output apparatus 50 can be prevented, and erroneous communication of document image data can be prevented.

Figure 12:
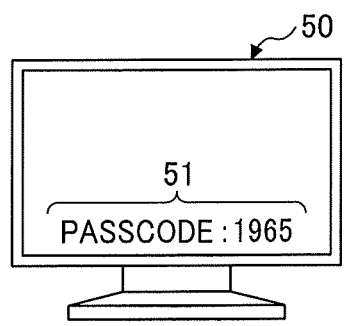
FIG. 12 is an example of a display style of passcode on an output apparatus.

FIG. 12 is an example of a display style of passcode on the output apparatus 50. As indicated in FIG. 12, a passcode 51 notified from the server 10 can be displayed on a display of the output apparatus 50.

Figure 13:
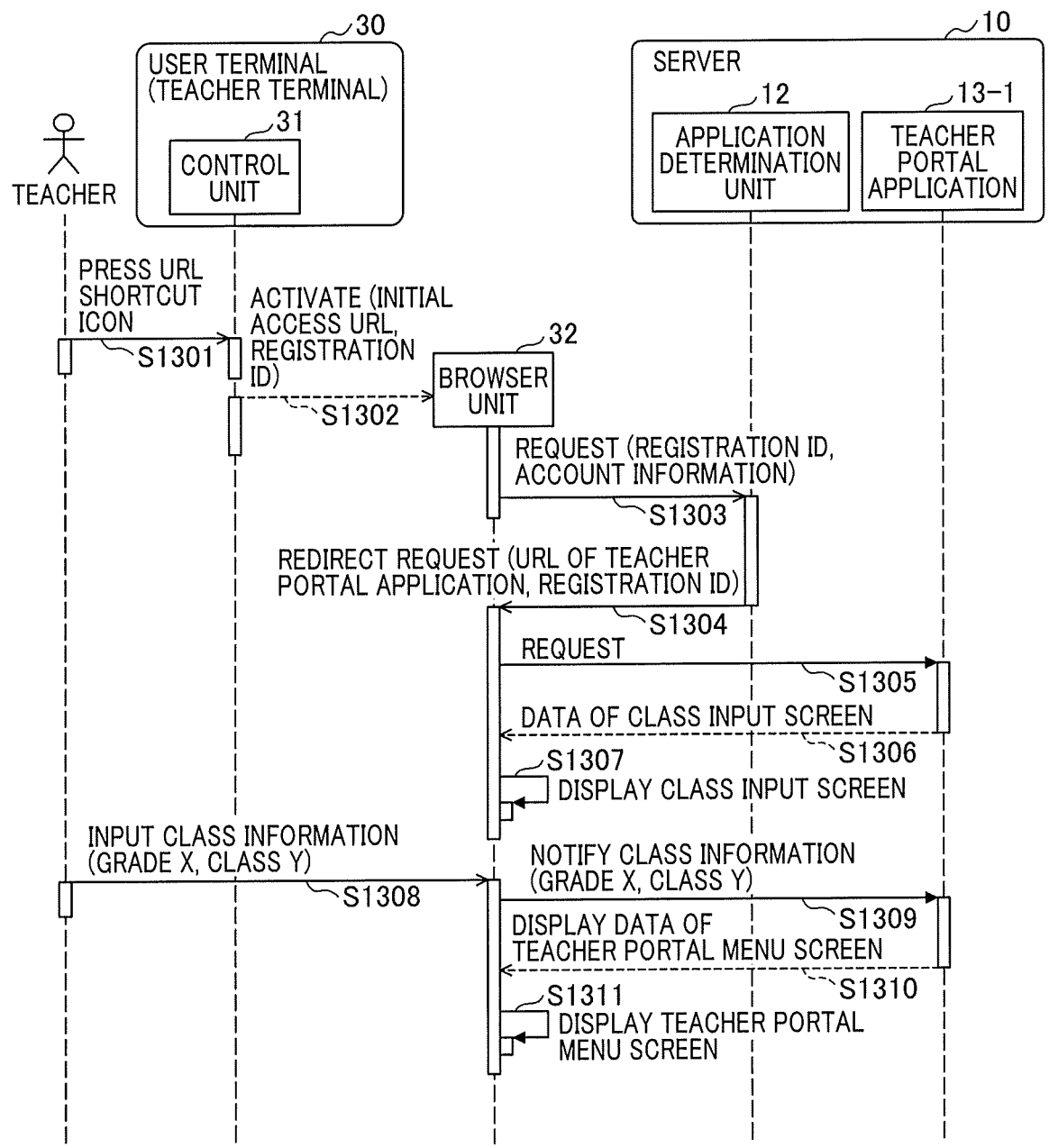
FIG. 13 is an example sequence diagram illustrating a procedure when a teacher terminal logs in the information processing system according to the first embodiment.

Hereinafter, a description is given of an operation of the information processing system 1 when the teacher terminal 30 logs in the information processing system 1 with reference to FIG. 13. FIG. 13 is an example sequence diagram illustrating a procedure when the teacher terminal 30 logs in the information processing system 1.

At the teacher terminal 30, the control unit 31 detects a pressing of a URL shortcut icon displayed on the teacher terminal 30 by a teacher who is a user of the teacher terminal 30 (step S1301).

The URL shortcut icon displayed on the teacher terminal 30 embeds an initial access URL used for connecting the teacher terminal 30 with the server 10 and a registration ID of "Tag_Ed" indicating a service to be provided to the teacher terminal 30. In other words, the URL shortcut icon embeds the tag information including the initial access URL and the registration ID. The registration ID of "Tag_Ed" is associated with the application ID of "AP_EdPortal" in the registration information storage unit 124.

When the pressing of the URL shortcut icon is detected at the teacher terminal 30 (step S1301), the teacher terminal 30 activates the browser unit 32 and then connects to a destination designated by the initial access URL embedded in the URL shortcut icon (step S1302).

In response to the activation of the browser unit 32 (step S1302), the browser unit 32 automatically transmits an HTTP request to the application determination unit 12 of the server 10 corresponding to the initial access URL embedded in the URL shortcut icon (step S1303). The HTTP request also includes account information as optional information in addition to the target registration ID. The account information includes, for example, information including identification information identifying the teacher using the teacher terminal 30 (hereinafter, "user ID") and the tenant ID identifying the user environment E1, or information capable of identifying or specifying the user ID and the tenant ID. For example, cookie can be used as the account information.

In response to receiving the HTTP request (step S1303), the application determination unit 12 of the server 10 authenticates the account information included in the HTTP request. If the authentication is successful in step S1303, steps S1304 and subsequent steps are performed. The authentication is performed, for example, by determining whether or not the account information included in the HTTP request is already registered in the user information storage unit 123 (FIG. 14).

FIG. 14 is an example of information stored in the user information storage unit 123 according to the first embodiment. As indicated in FIG. 14, the user information storage unit 123 stores information items, for example, tenant ID and user ID for each user who is allowed to use each application installed on the server 10. The user may be one or more teachers and one or more students.

In the embodiment, as to the students, a common user ID is allocated to all of the students who can use the information processing system 1 in the user environment E1. Further, in the embodiment, the user ID is allocated to each teacher who can use the information processing system 1 within the user environment E1.

Further, in the embodiment, it is assumed that the teachers alone are allowed to access the intermediary apparatus 20 in the information processing system 1.

Therefore, in the user information storage unit 123 (FIG. 14), the browser ID, the user ID of "student" indicating that the user is the student is not associated with the browser ID that is the identification information of the browser unit 23 of the intermediary apparatus 20. In other words, the useable application, associated with the user ID indicating the student, does not include the application that uses the browser unit 23.

Further, in an example case of the user information storage unit 123 (FIG. 14), the browser ID is associated with the user IDs of "taro" and "jiro" indicating that each user is the teacher. In other words, some useable applications, associated with the user ID indicating the teacher, include an application that causes the browser unit 23 to display the document image data on the output apparatus 50.

In the embodiment, the browser ID of the browser unit 23 of the intermediary apparatus 20 is associated only with the user information of the specific user having the access right to the intermediary apparatus 20 to allow the specific user to access the intermediary apparatus 20.

Therefore, in the embodiment, the access right of the user terminal (e.g., teacher terminal 30, student terminal 40) to the intermediary apparatus 20 can be restricted in the information processing system 1. Therefore, as to the embodiment, even if a user who does not have the access right to the intermediary apparatus 20 uploads the document image data to the server 10, a situation of displaying the document image data, uploaded by the unauthorized user, on the output apparatus 50 can be prevented.

If the authentication is successful in step S1303, the application determination unit 12 transmits a response (HTTP response) including a redirect request to the browser unit 32 (step S1304).

The redirect request includes a URL of a teacher portal application 13-1 (hereinafter, "teacher portal URL") related to the In-application ID of "AP_EdPortal" stored in the registration information storage unit 124 (FIG. 9) in association with the target registration ID of "Tag_Ed", as the redirect destination. The teacher portal URL can be specified or identified by referring to the application information storage unit 121 (FIG. 10). In this description, the teacher portal application 13-1 is an application included in the input application group 13.

In accordance with the redirect request (step S1304), the browser unit 32 transmits an HTTP request (redirect request) to the teacher portal URL (i.e., teacher portal application 13-1), which is the redirect destination (step 1305).

In response to receiving the HTTP request (step 1305), the teacher portal application 13-1 transmits, to the browser unit 32 of the teacher terminal 30, a response including display data of a class input screen to be used for inputting class information corresponding to document image data to be displayed on the output apparatus 50, and a script to be used for executing a process of transmitting the class information input on the class input screen to the server 10 (step S1306). The script and display data are examples of data indicating the request for executing the processing to the teacher terminal 30.

In response to receiving the response (step S1306), the browser unit 32 generates the class input screen based on the display data, and displays the class input screen on the output device 311 (step S1307).

When the browser unit 32 receives an input of the class information by the teacher (step S1308), the browser unit 32 notifies the input class information to the teacher portal application 13-1 (step S1309).

Then, the teacher portal application 13-1 transmits, to the browser unit 32, display data to be used for rendering a teacher portal menu screen in accordance with the input class information (step S1310).

Then, the browser unit 32 displays the teacher portal menu screen based on the display data on the teacher terminal 30 (step S1311).

Figure 15:
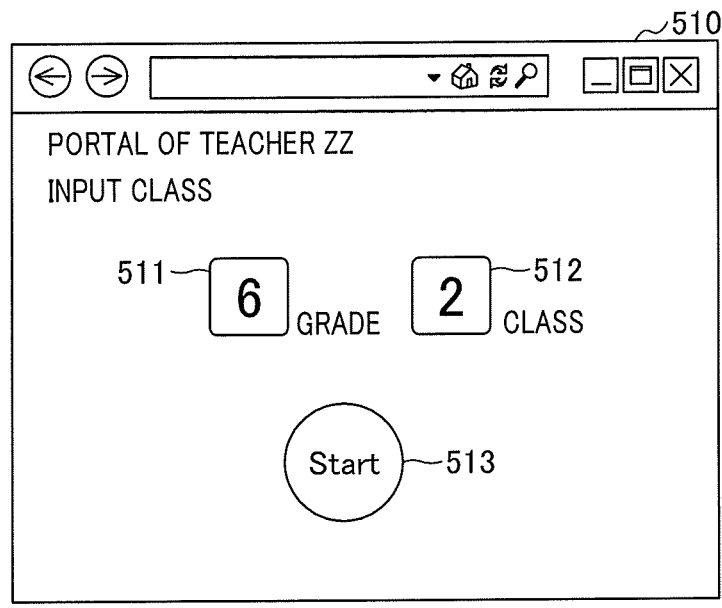
FIG. 15 is an example of a display style of a class input screen.

FIG. 15 is an example of a display style of a class input screen 510. As indicated in FIG. 15, the class input screen 510 includes, for example, an input field 511, an input field 512, and a button 513. A grade is input into the input field 511 and a class is input into the input field 412.

The class input screen 510 transitions or shifts to the teacher portal menu screen when the grade and the class are input and then the button 513 is operated.

Figure 16:
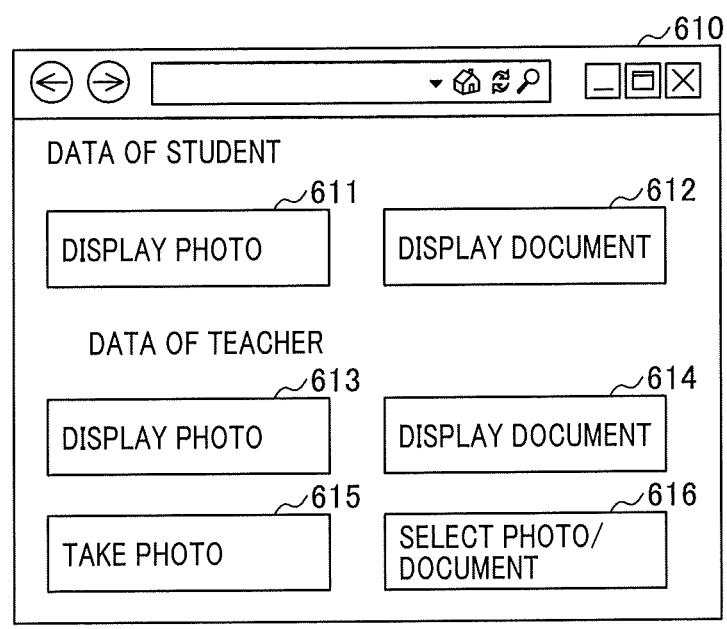
FIG. 16 is an example of a display style of a teacher portal menu screen.

FIG. 16 is an example of a display style of a teacher portal menu screen 610. As indicated in FIG. 16, the teacher portal menu screen 610 includes, for example, icons 611, 612, 613 and 614 used for selecting the document image data uploaded to the server 10 by one or more students corresponding to the grade and class designated by the class input screen 510.

Further, the teacher portal menu screen 610 includes icons 613 and 614 used for selecting the document image data uploaded to the server 10 by the teacher, and icons 615 and 616 used for uploading the document image data from the teacher terminal 30 to the server 10.

The information processing system 1 executes a process in accordance with the icon selected on the teacher portal menu screen 610. Hereinafter, a description is given of an example case when the icon 611 used for selecting the image data uploaded by the student corresponding to the designated grade and class is operated on the teacher portal menu screen 610 with reference to FIG. 17.

Figure 17:
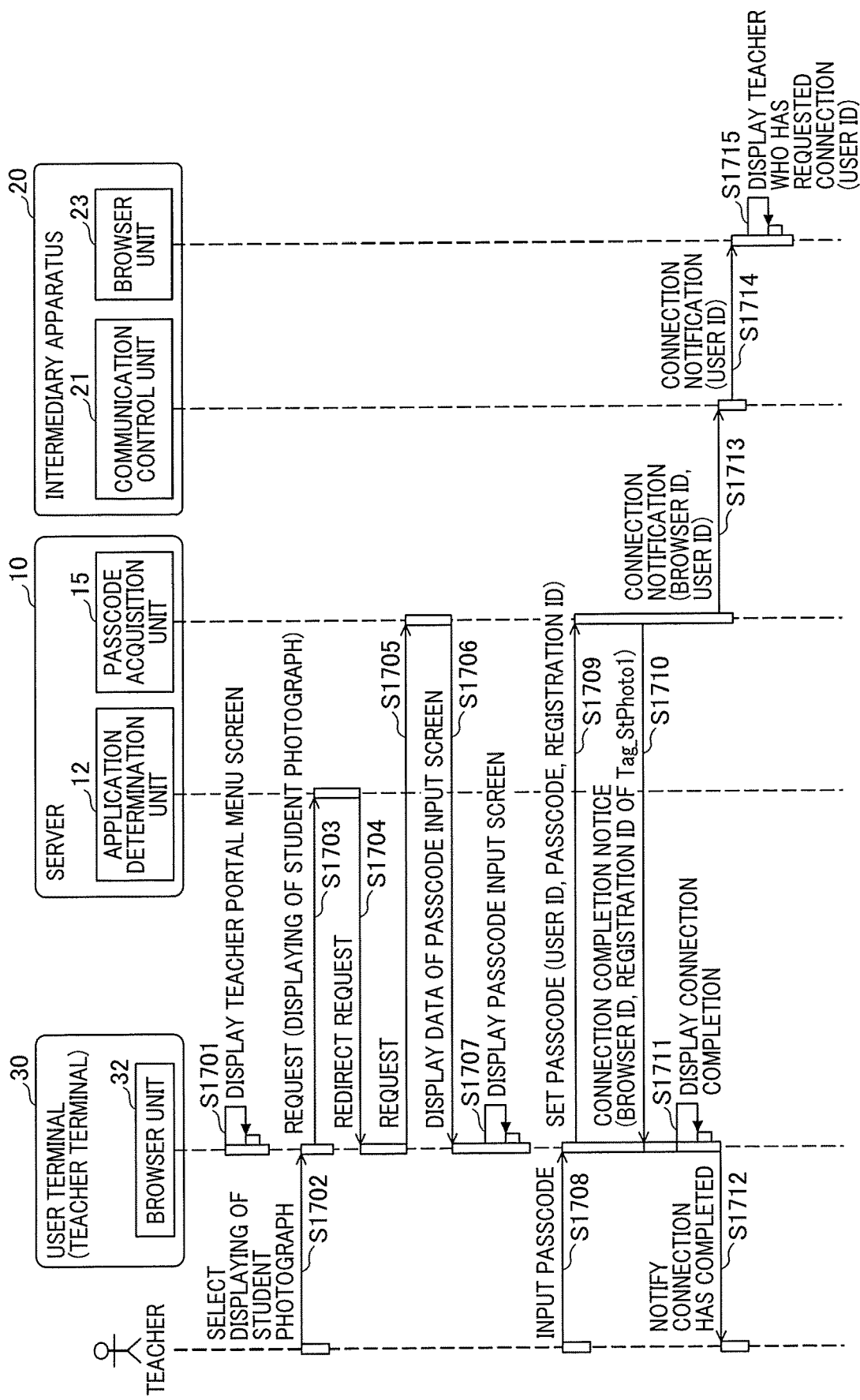
FIG. 17 is an example sequence diagram illustrating a process of selecting image data at a teacher terminal.

FIG. 17 is an example sequence diagram illustrating a process of selecting image data at the teacher terminal 30.

The browser unit 32 of the teacher terminal 30 displays the teacher portal menu screen 610 on the teacher terminal 30 (step S1701).

In response to displaying the teacher portal menu screen 610 (step S1701), the browser unit 32 receives a selection of the icon 611 indicating "displaying of student photograph" (step S1702).

The icon 611 is embedded with a URL for connecting to the teacher portal menu screen 610 and the registration ID of "Tag_StPhotoCode" indicating a service of "displaying of student photograph." The registration ID of "Tag_StPhotoCode" is associated with the In-application ID and the Out-application ID but not associated with the browser ID in the registration information storage unit 124 (FIG. 9). Therefore, the information processing system 1 performs step S1703 to associate the registration ID and the browser ID.

In response to receiving the selection of the icon 611 (step S1702), the browser unit 32 automatically transmits, to the application determination unit 12, an HTTP request including the URL embedded in the icon 611 (step S1703). The HTTP request includes the registration ID of "Tag_StPhotoCode."

In response to receiving the HTTP request (step S1703), the application determination unit 12 transmits, to the browser unit 32, a response (HTTP response) including a redirect request (step 1704).

The redirect request includes a URL (hereinafter, "passcode input URL") of a passcode input screen to be used for inputting or entering a passcode. This is because the browser ID corresponding to the registration ID of "Tag_StPhotoCode" is not yet set in the registration information storage unit 124 (FIG. 9).

In response to receiving the redirect request (step 1704), the browser unit 32 automatically transmits an HTTP request to the passcode acquisition unit 15 corresponding to the passcode input URL (step 1705). The HTTP request includes the registration ID of "Tag_StPhotoCode."

Since the browser ID to be associated with the registration ID of "Tag_StPhotoCode" is not yet set in the registration information storage unit 124 (FIG. 9), the passcode acquisition unit 15 transmits display data indicating the passcode input screen to the browser unit 32 (step 1706).

Then, the browser unit 32 receives the display data and displays the passcode input screen (step S1707).

In response to receiving an input of passcode from the teacher (step S1708), the browser unit 32 transmits, to the passcode acquisition unit 15, a HTTP request including the user ID of the teacher, the passcode, and the registration ID of "Tag_StPhotoCode" (step S1709).

The input passcode is the passcode that is displayed on the output apparatus 50 in advance. The teacher visually checks the passcode displayed on the output apparatus 50 and inputs the passcode on the passcode input screen.

In response to receiving the HTTP request (step S1709), the passcode acquisition unit 15 determines a browser ID to be associated with the registration ID of "Tag_StPhotoCode" using the passcode. Hereinafter, a description is given of a method of determining the browser ID.

The passcode acquisition unit 15 refers to the registration information storage unit 124 (FIG. 9) to extract the tag information, which matches the combination of the In-application ID and the Out-application ID associated with the registration ID. Then, among the browser IDs included in the extracted tag information, the passcode acquisition unit 15 determines a specific browser ID associated with a specific passcode in the apparatus information storage unit 122 (FIG. 8), which matches the input passcode, as the browser ID to be associated with the registration ID.

Hereinafter, a description is given of determining the browser ID using the registration information storage unit 124 (FIG. 9). The registration ID of "Tag_StPhotoCode" is associated with the In-application ID of "AP_StPhoto" and the Out-application ID of "AP_PhotoDoc" in the registration information storage unit 124 (FIG. 9).

Therefore, the passcode acquisition unit 15 extracts the tag information including a combination of the In-application ID of "AP_StPhoto" and the Out-application ID of "AP_PhotoDoc" from the registration information storage unit 124 (FIG. 9).

At this stage, the passcode acquisition unit 15 extracts the tag information including three registration IDs of "Tag_StPhoto1," "Tag_StPhoto2" and "Tag_StPhoto3." The tag information includes the browser IDs of "BROWSER1," "BROWSER2" and "BROWSER3."

Then, the passcode acquisition unit 15 specifies or identifies specific apparatus information including the specific passcode that matches the passcode input on the passcode input screen in the apparatus information storage unit 122 (FIG. 8). In this example case, it is assumed that a passcode of "1234" is input to the passcode input screen.

Therefore, the passcode acquisition unit 15 specifies of identifies the apparatus information including the passcode of "1234" in the apparatus information storage unit 122 (FIG. 8), in which the browser ID included in the identified apparatus information is "BROWSER1."

Therefore, the passcode acquisition unit 15 determines "BROWSER1" as the browser ID to be associated with the registration ID of "Tag_StPhotoCode."

In response to determining the browser ID to be associated with the registration ID of "Tag_StPhotoCode" (step S1709), the passcode acquisition unit 15 transmits a connection completion notice to the browser unit 32 (step S1710). The connection completion notice includes a specific browser ID of a specific browser connected to the browser unit 32, in which the specific browser ID is the identification information of the browser unit 23 of the intermediary apparatus 20. In other words, the specific browser ID is information indicating the intermediary apparatus 20 connected to the teacher terminal 30.

In response to receiving the connection completion notice (step S1710), the browser unit 32 displays a screen including information (e.g., specific browser ID) indicating the connected apparatus and information indicating that the connection has completed on the teacher terminal 30 (step S1711).

Then, the browser unit 32 notifies the information indicating that the connection to the intermediary apparatus 20 has completed to the teacher (step S1712)

In the server 10, the passcode acquisition unit 15 checks whether the browser state of the specific browser ID associated with the registration ID is "being connected" and "power ON" in the apparatus information storage unit 122 (FIG. 8). If the browser state of the specific browser ID associated with the registration ID is "being connected," the passcode acquisition unit 15 transmits a connection notification to the communication control unit 21 of the intermediary apparatus 20 associated with the browser ID (step S1713). At this stage, the connection notification includes the user ID of the teacher.

In response to receiving the connection notification (step S1713), the communication control unit 21 notifies the user ID to the browser unit 23 (step S1714), and then the browser unit 23 displays the user ID of the teacher who has requested the connection to the intermediary apparatus 20, using the output apparatus 50 (step S1715).

Figure 18:
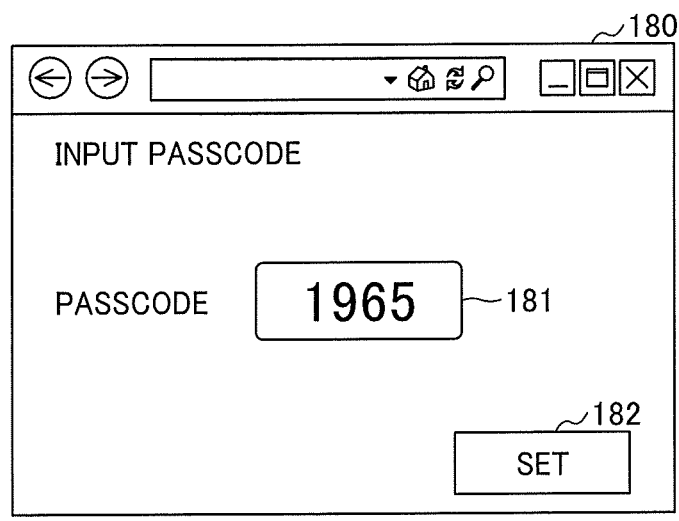
FIG. 18 is an example of a display style of a passcode input screen.

Hereinafter, a description is given of examples of a display style at the teacher terminal 30 and the output apparatus 50 with reference to FIGS. 18 and 19. FIG. 18 is an example of a display style of a passcode input screen 180 at the teacher terminal 30. The passcode input screen 180 (FIG. 18) is displayed on the teacher terminal 30 in step S1707 of FIG. 17.

The passcode input screen 180 is displayed using the browser unit 32 of the teacher terminal 30. The passcode input screen 180 includes, for example, an input field 181 and a button 182. In the embodiment, when a passcode is input to the input field 181 and then the button 182 is operated, the passcode is transmitted from the browser unit 32 to the server 10.

Figure 19:
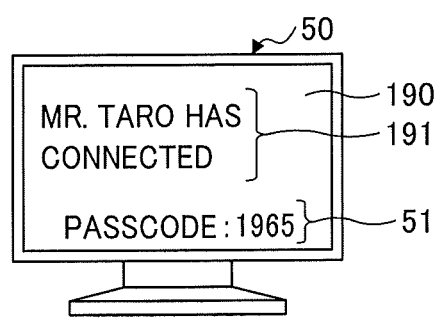
FIG. 19 is an example of a display style of a user ID of a person who has requested a connection to an output apparatus.

FIG. 19 is an example of a display style of a screen 190 displaying a user ID of a person who has requested the connection to the output apparatus 50. The screen 190 (FIG. 19) is displayed on the output apparatus 50 in step S1715 of FIG. 17.

The screen 190 includes, for example, a passcode 51 allocated from the server 10 and a message 191 including the user ID included in the connection notification transmitted to the output apparatus 50. The message 191 includes, for example, the user ID of "taro" corresponding to the teacher who uses the teacher terminal 30.

Hereinafter, a description is given of an operation of displaying a photograph (image data) uploaded from the student terminal 40 to the server 10 on the output apparatus 50 with reference to FIG. 20.

Figure 20:
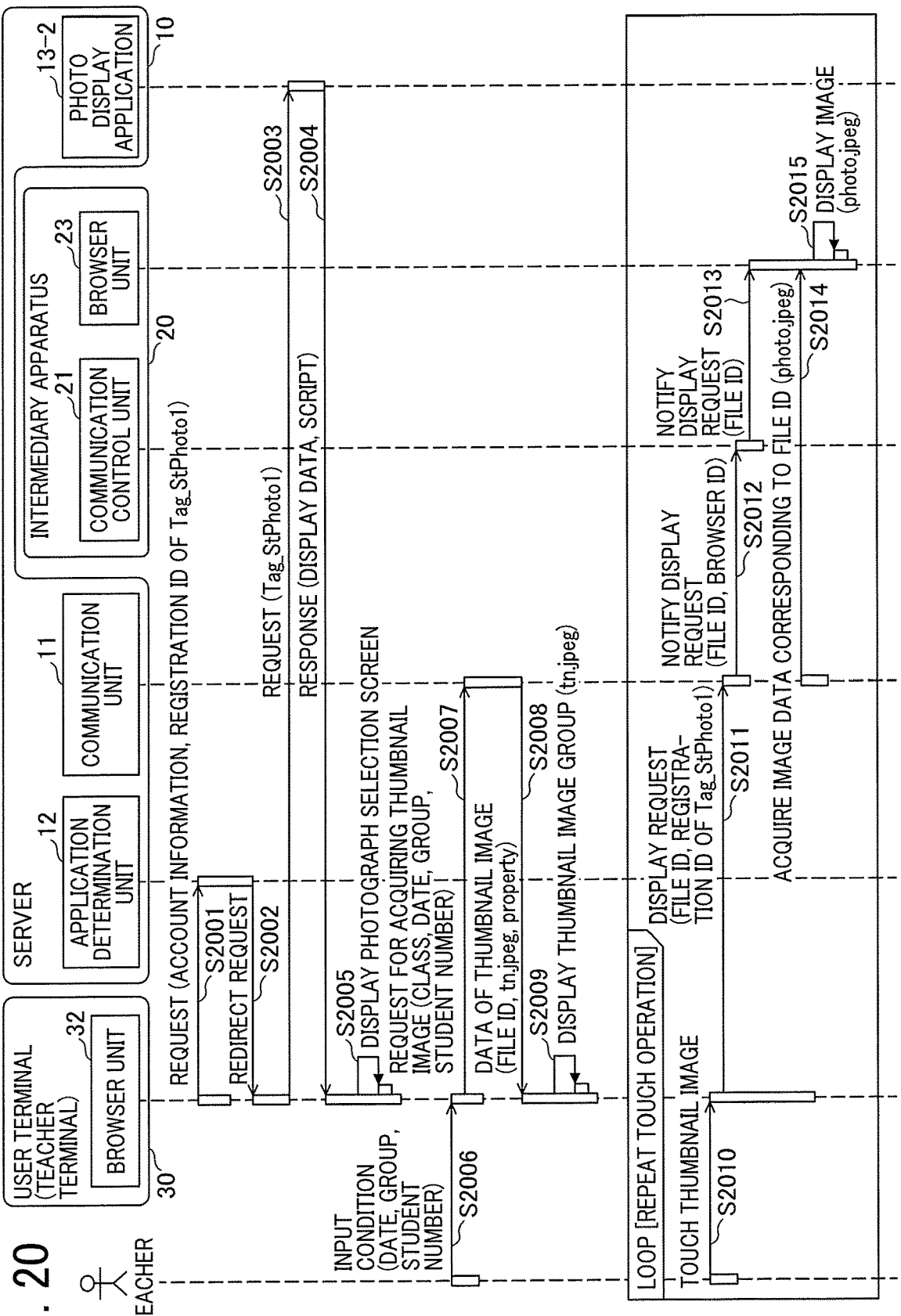
FIG. 20 is an example sequence diagram illustrating a process of outputting image data, uploaded from a student terminal, to an output apparatus.

FIG. 20 is an example sequence diagram illustrating a process of outputting image data, uploaded from the student terminal 40, to the output apparatus 50.

In this example case, in the sequence of FIG. 17, the teacher operates the icon 611 on the teacher portal menu screen 610 to select a service of "displaying of student photograph."

Then, the browser unit 32 automatically transmits an HTTP request including a URL associated with the concerned service to the application determination unit 12 of the server 10 (step S2001). The HTTP request includes the user ID of the teacher (account information) and the registration ID of "Tag_StPhoto1" associated with the concerned service of "displaying of student photograph."

In response to receiving the HTTP request (step S2001), the application determination unit 12 transmits a response (HTTP response) including a redirect request to the browser unit 32 (step S2002).

The redirect request includes a URL of a photo display application 13-2 (hereinafter, "photo display URL") related to the In-application ID of "AP_StPhoto" associated with the registration ID of "Tag_StPhoto1" in the registration information storage unit 124 (FIG. 9) as the redirect destination. The photo display application 13-2 is one of applications included in the input application group 13.

In accordance with the redirect request (step S2002), the browser unit 32 transmits (redirects) an HTTP request to the photo display URL (i.e., photo display application 13-2) as the redirect destination (step S2003).

In response to receiving the HTTP request (step S2003), the photo display application 13-2 transmits, to the browser unit 32, a response including display data of a photograph selection screen to be used for selecting a to-be-displayed photograph, and a script to be executed on the photograph selection screen (step S2004).

In response to receiving the display data and the script of the photograph selection screen (step S2004), the browser unit 32 displays the photograph selection screen on the teacher terminal 30 (step S2005).

After the teacher inputs conditions specifying the to-be-displayed photograph such as image data (step S2006), the browser unit 32 transmits, to the communication unit 11, a request for acquiring one or more thumbnail images of photograph (image) matching the specified conditions (step S2007). The conditions specifying the photograph indicate, for example, a name of a group to which a student belongs, a student number, and date and time when the photograph was uploaded.

In response to receiving the request (step S2007), the communication unit 11 transmits a thumbnail image group satisfying the specified conditions to the browser unit 32 (step S2008). At this stage, the communication unit 11 returns a thumbnail image of "tn.jpeg," a file ID identifying the image, and property or attribute (e.g., file name, photograph captured date, student information) of the image.

Then, the browser unit 32 displays the acquired thumbnail image group on the teacher terminal 30 (step S2009).

If the browser unit 32 receives a selection of a thumbnail image from the thumbnail image group being displayed (step S2010), the browser unit 32 transmits the file ID associated with the selected thumbnail image, and the registration ID of "Tag_StPhoto1" to the communication unit 11 with a display request (step S2011).

Then, the communication unit 11 notifies the display request to the communication control unit 21 of the intermediary apparatus 20 having the browser unit 23 specified or identified by the browser ID of "BROWSER1" associated with the registration ID of "Tag_StPhoto1" in the registration information storage unit 124 (step S2012).

In response to receiving the display request notification (step S2012), the communication control unit 21 notifies, to the browser unit 23, the display request of image data corresponding to the file ID (step S2013).

In response to receiving the display request notification (step S2013), the browser unit 23 acquires the image data corresponding to the file ID from the communication unit 11 (step S2014), and then outputs the acquired image data to the output apparatus 50 (step 2015). In other words, the browser unit 23 displays the acquired image data using the output apparatus 50.

Figure 21:
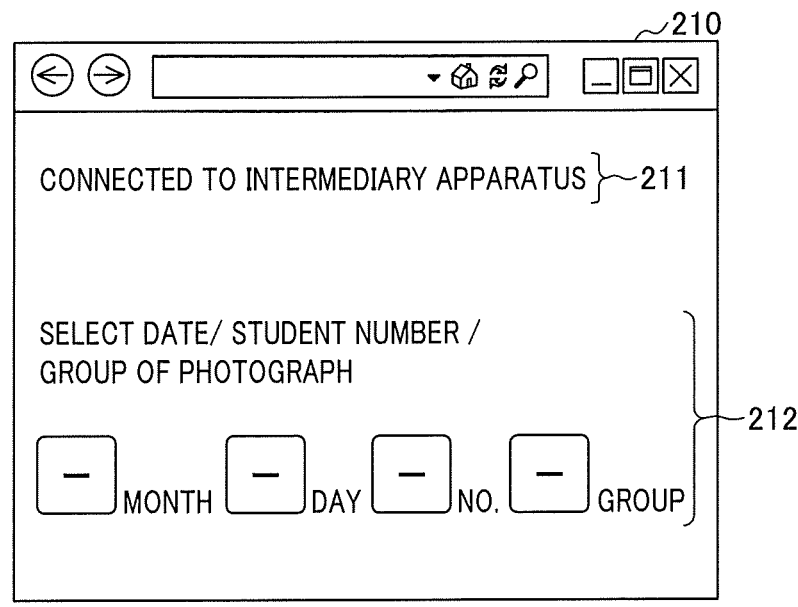
FIG. 21 is an example of a display style of a photograph selection screen used for selecting a photograph.

Hereinafter, a description is given of examples of display style using the browser unit 32 with reference to FIGS. 21 to 24. FIG. 21 is an example of a display style of a photograph selection screen 210 used for selecting a photograph. The photograph selection screen 210 (FIG. 21) is displayed in step S2005 of FIG. 20.

As indicated in FIG. 21, the photograph selection screen 210 includes, for example, a message 211 notifying that the browser unit 32 is connected to the intermediary apparatus 20, and an input field 212 used for inputting conditions specifying one or more students who have uploaded the photograph (image data).

In the embodiment, the date and time when the photograph was taken, the student number of the student, the group to which the student belongs, or the like are input to the input field 212 as the conditions specifying the student.

Figure 22:
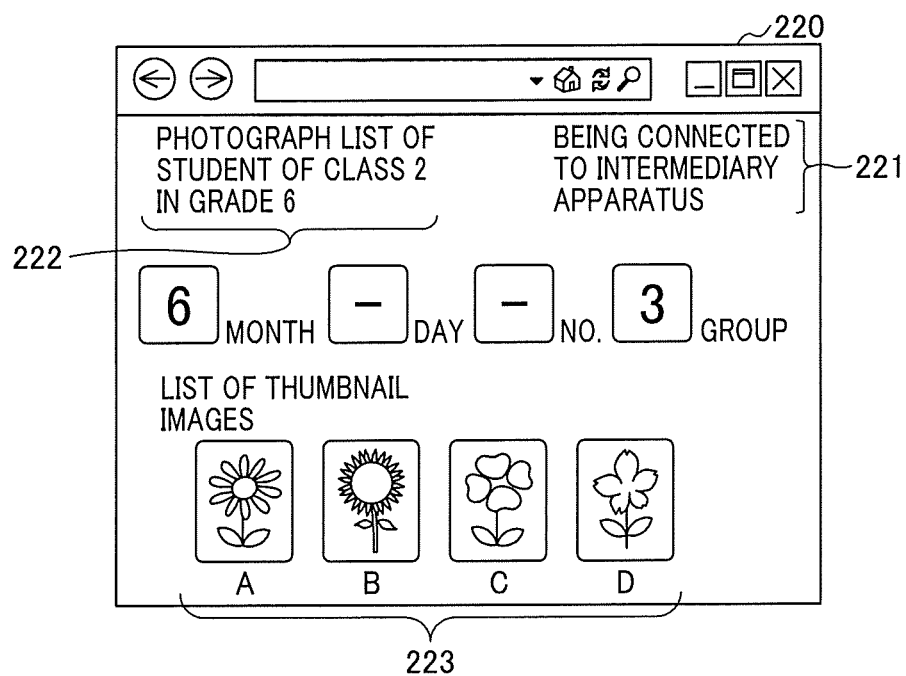
FIG. 22 is an example of a display style of a thumbnail image group.

FIG. 22 is an example of a display style of a screen 220 displaying a thumbnail image group. The screen 220 (FIG. 22) is displayed in step S2009 of FIG. 20.

As indicated in FIG. 22, the screen 220 includes, for example, a message 221 notifying that the teacher terminal 30 is being connected to the intermediary apparatus 20, and a message 222 indicating that photographs are uploaded by the student corresponding to the grade and the class input on the class input screen 510.

Further, a thumbnail image group 223 that matches the conditions, input or entered into the input field 212, is displayed on the screen 220. The thumbnail image group 223 (FIG. 22) indicates a thumbnail image group of photographs uploaded by group 3 of class 2 in grade 6.

Figure 23:
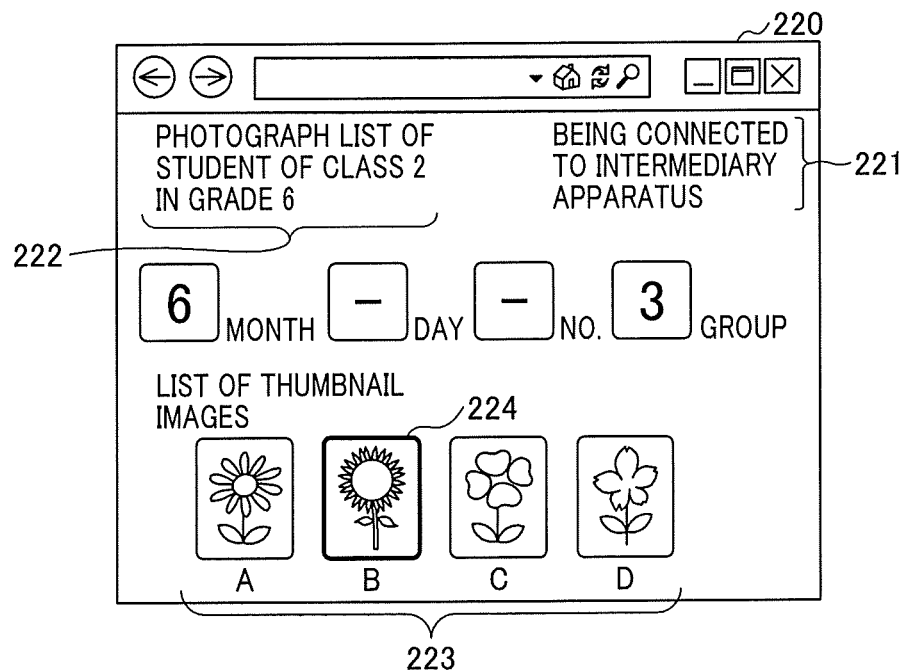
FIG. 23 is an example of a display style when one thumbnail image is selected from a thumbnail image group.

FIG. 23 is an example of a display style when one thumbnail image is selected from the thumbnail image group 223 (FIG. 22).

In an example case of FIG. 23, among four thumbnail images included in the thumbnail image group 223 (FIG. 22) displayed on the screen 220, a thumbnail image 224 is selected, in which an image, which is an origin or source of the thumbnail image 224, is selected by the browser unit 23 of the intermediary apparatus 20 as the image to be displayed using the output apparatus 50.

Figure 24:
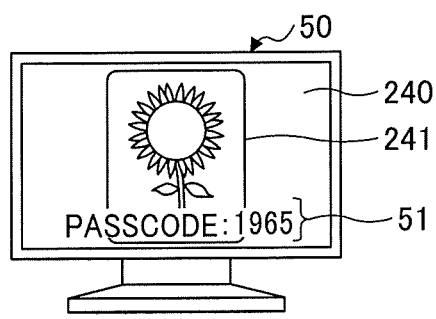
FIG. 24 is an example of a display style of an image on an output apparatus according to the first embodiment.

FIG. 24 is an example of a display style of a screen 240 displaying an image on the output apparatus 50 of the first embodiment. The screen 240 (FIG. 24) is displayed on the output apparatus 50.

The screen 240 displays an image 241, which is the origin of the thumbnail image 224 selected in FIG. 23, and a passcode 51.

As to the above described configuration of the embodiment, even if the teacher terminal 30 and the output apparatus 50 are not associated with each other, when the teacher terminal 30 accesses the server 10, the server 10 causes the output apparatus 50 to display the passcode using the output apparatus 50, and then the passcode is input at the teacher terminal 30, and then the teacher terminal 30 can be connected to the output apparatus 50.

Therefore, as to the above described configuration of the embodiment, by performing a simple operation to the teacher terminal 30, which is not yet connected to the output apparatus 50, the image data stored in the server 10 can be displayed using the output apparatus 50, with which operability (e.g., user friendliness) of the apparatus can be improved.

Figure 25A:
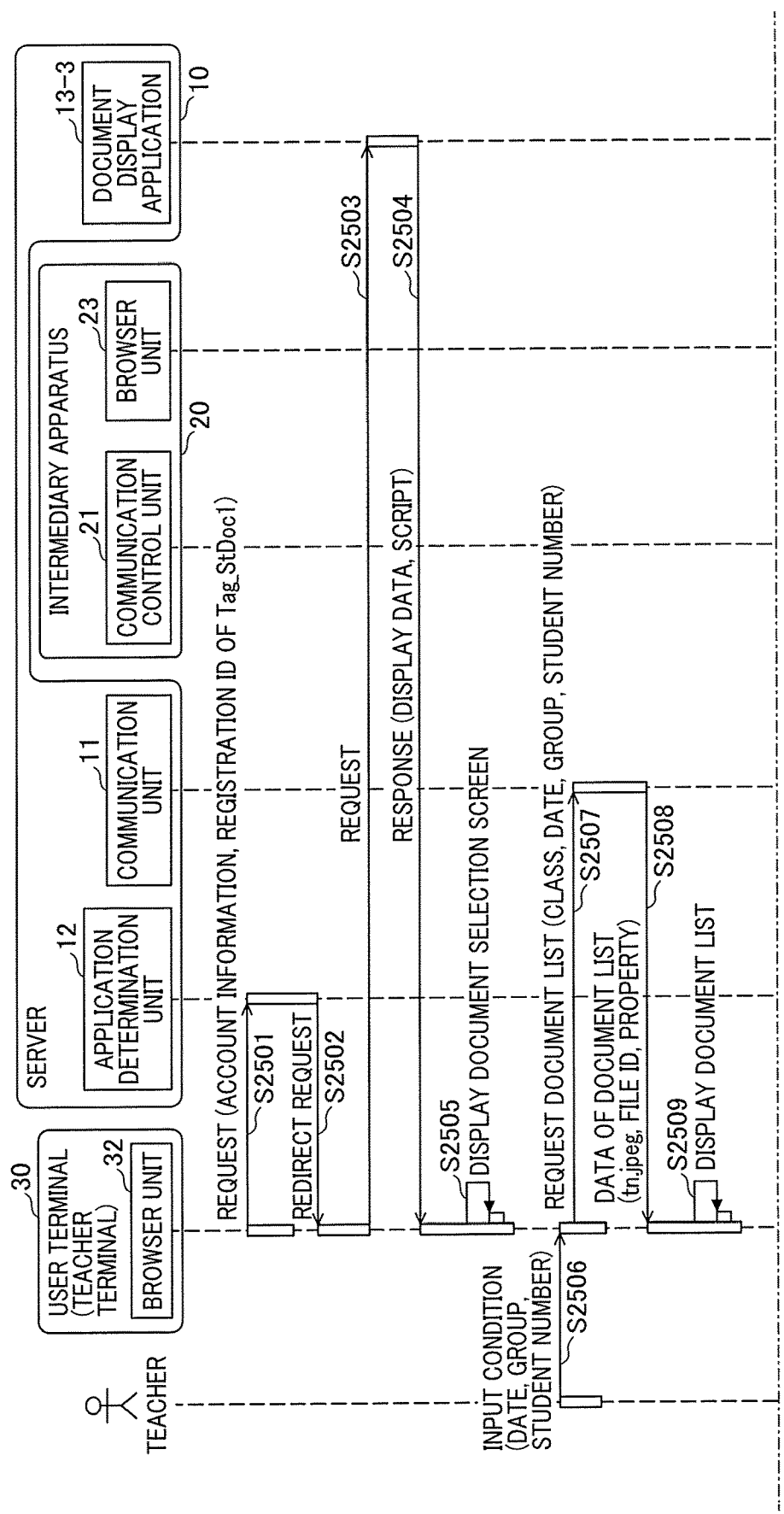
FIGS. 25A and 25B (FIG. 25) are an example sequence diagram of a process of outputting document data, uploaded from a student terminal, to an output apparatus.
Figure 25B:
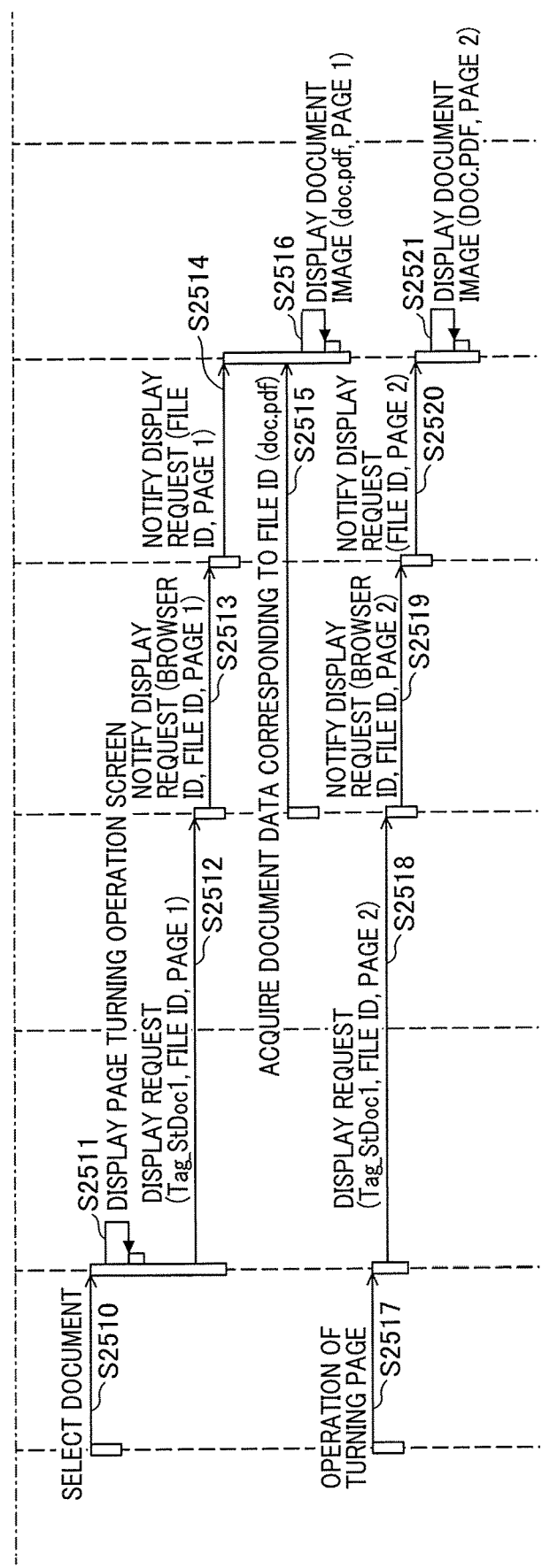

Hereinafter, a description is given of a process of outputting document data, uploaded from the student terminal 40, to the output apparatus 50 with reference to FIG. 25. FIGS. 25A and 25B (FIG. 25) are an example sequence diagram of a process of outputting document data, uploaded from the student terminal 40, to the output apparatus 50.

In this case, in FIG. 17, the teacher selects a service of "displaying of student document" by operating the icon 612 on the teacher portal menu screen 610.

Then, the browser unit 32 automatically transmits an HTTP request including a URL associated with the concerned service to the application determination unit 12 of the server 10 (step S2501). The HTTP request includes the user ID of the teacher (account information), and the registration ID of "Tag_StDoc1" associated with the concerned service of "displaying of student document."

In response to receiving the HTTP request (step S2501), the application determination unit 12 transmits a response (HTTP response) including a redirect request to the browser unit 32 (step S2502).

The redirect request includes a URL of a document display application 13-3 (hereinafter, "document display URL") related to the In-application ID of "AP_StDoc" associated with the registration ID of "Tag_StDoc1" in the registration information storage unit 124 (FIG. 9) as the redirect destination. The document display application 13-3 is one of applications included in the input application group 13.

In accordance with the redirect request (step S2502), the browser unit 32 transmits (redirects) an HTTP request to the document display URL (i.e., document display application 13-3) set as the redirect destination (step S2503).

In response to receiving the HTTP request (step S2503), the document display application 13-3 transmits, to the browser unit 32, a response including display data of a document selection screen to be used for selecting a to-be-displayed document, and a script to be executed on the document selection screen (step S2504).

In response to receiving the display data and the script of the document selection screen (step S2504), the browser unit 32 displays the document selection screen on the teacher terminal 30 (step S2505).

After the teacher inputs conditions specifying the document data to be displayed (step S2506), the browser unit 32 transmits, to the communication unit 11, a request for acquiring a list of document data matching the conditions (step S2507). The conditions specifying the document data indicate, for example, a name of a group to which a student belongs, a student number, and date and time when the document data was uploaded.

In response to receiving the request (step S2507), the communication unit 11 transmits a document data group satisfying the specified conditions to the browser unit 32 (step S2508). At this stage, the communication unit 11 returns a document file ID and property information (e.g., file name, creation date, student information) for each document data.

Then, the browser unit 32 displays the acquired document data group on the teacher terminal 30 (step S2509).

Then, the browser unit 32 receives a selection to the displayed document data (step S2510).

If the selected document data have a plurality of pages, the browser unit 32 displays a screen used for a page turning operation on the teacher terminal 30 (step S2511), which is referred to as a page turning operation screen.

Then, the browser unit 32 transmits, to the communication unit 11, the file ID associated with the selected document data, the registration ID of "Tag_StDoc1," and the page number to be displayed with a display request (step S2512). At this stage, "page 1," indicating that the page to be displayed is the first page, is transmitted to the communication unit 11 with the display request.

Then, the communication unit 11 notifies "page 1" and the display request to the communication control unit 21 of the intermediary apparatus 20 having the browser unit 23 specified or identified by the browser ID of "BROWSER1" associated with the registration ID of "Tag_StDoc1" in the registration information storage unit 124 (step S2513).

In response to receiving the display request notification (step S2513), the communication control unit 21 notifies the display request of the first page ("page 1") of the document data corresponding to the file ID to the browser unit 23 (step S2514).

In response to receiving the display request notification (step S2514), the browser unit 23 acquires the document data corresponding to the file ID from the communication unit 11 (step S2515). The acquired document data is, for example, the document data using a given format, such as portable document format (PDF) file.

Then, the browser unit 23 outputs the first page ("page 1") of the acquired document data having the plurality of pages to the output apparatus 50 (step S2516) In other words, the browser unit 23 displays the first page ("page 1") of the acquired document data using the output apparatus 50.

If an operation of turning the page is performed on the page turning operation screen (step S2517), the browser unit 32 transmits, to the communication unit 11, the file ID associated with the document data, the registration ID of "Tag_StDoc1," and the page number to be displayed ("page 2") with a display request (step S2518).

Then, the communication unit 11 notifies "page 2" with the display request to the communication control unit 21 of the intermediary apparatus 20 having the browser unit 23 specified or identified by the browser ID of "BROWSER1" (step S2519).

Then, the communication control unit 21 notifies the display request of the second page ("page 2") of the document data corresponding to the file ID to the browser unit 23 (step S2520).

Then, the browser unit 23 outputs the second page ("page 2") of the acquired document data having the plurality of pages to the output apparatus 50 (step S2521). In other words, the browser unit 23 displays the second page of the acquired document data using the output apparatus 50.

Figure 26:
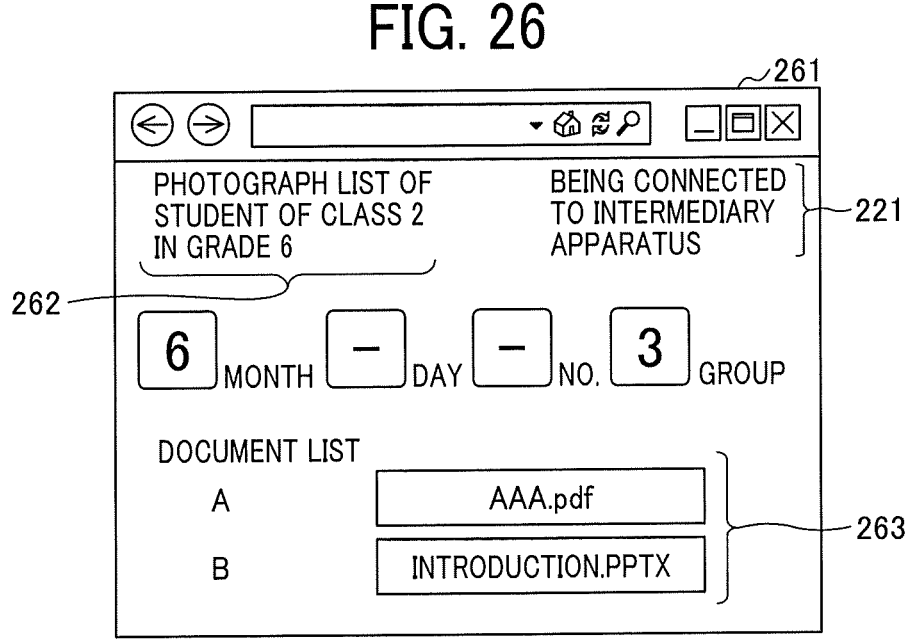
FIG. 26 is an example of a display style of a list of document data group.

Hereinafter, a description is given of examples of a display style using the browser unit 32 with reference to FIGS. 26 to 28. FIG. 26 is an example of a display style of a screen 261 displaying a list of document data group. The screen 261 (FIG. 26) is displayed by the browser unit 32 in step S2509 of FIG. 25.

As indicated in FIG. 26, the screen 261 includes, for example, a message 221 notifying that the teacher terminal 30 is being connected to the intermediary apparatus 20, and a message 262 indicating that photographs are uploaded by the students corresponding to the grade and the class input on the class input screen 510. Further, a list 263 of document data (document data list) is displayed on the screen 261.

Figure 27:
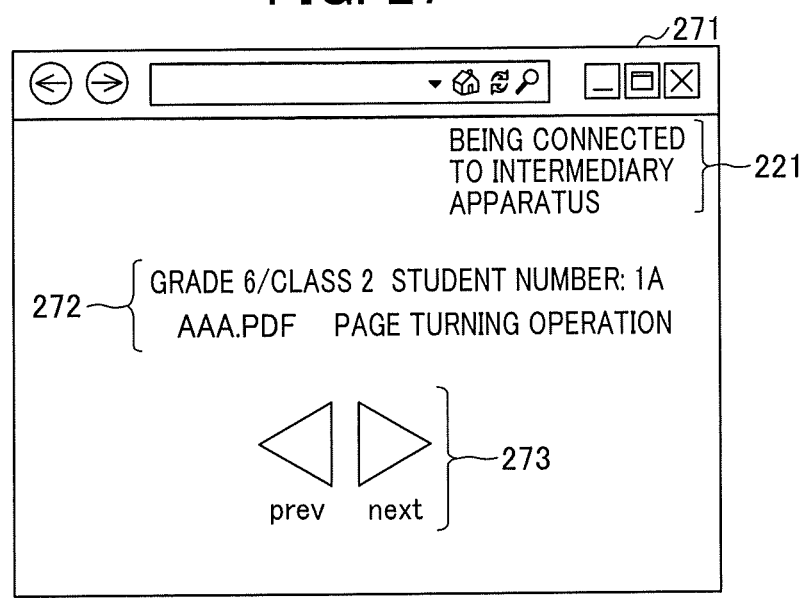
FIG. 27 is an example of a screen used for page turning operation.

FIG. 27 is an example of a screen 271 used for the page turning operation. The screen 271 (FIG. 27) is displayed using the browser unit 32 in step S2511 of FIG. 25.

As indicated in FIG. 27, the screen 271 includes, for example, a message 221 notifying that the teacher terminal 30 is being connected to the intermediary apparatus 20, and information 272 related to the document data to be displayed using the output apparatus 50.

The information 272 related to the document data includes, for example, the grade and the class input on the class input screen, the name of the student who has uploaded the document data, and the file name of document data. In other words, the information 272 related to the document data includes property information of the document data.

Further, the screen 271 includes an operation button 273 for operating pages included in the document data. By operating the operation button 273 on the screen 271, a page of the document data to be displayed on the output apparatus 50 can be turned to be the next or the previous page. In other words, in the embodiment, the page of the document data displayed using the output apparatus 50 can be switched by performing a given operation on the screen 271 displayed on the teacher terminal 30.

Figure 28:
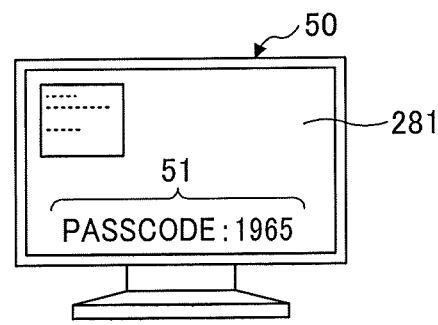
FIG. 28 is an example of a display style of document data on an output apparatus according to the first embodiment.

FIG. 28 is an example of a display style of a screen 281 displaying the document data on the output apparatus 50 of the first embodiment. The screen 281 (FIG. 28) is displayed on the output apparatus 50 in step S2516 and step S2521 of FIG. 25. The document data is displayed on the screen 281. Further, a passcode 51 is displayed on the screen 281.

As above described, the page turning of document data displayed on the output apparatus 50 can be performed at the teacher terminal 30. Therefore, the operability (e.g., user friendliness) of the apparatus can be improved.

Hereinafter, a description is given of a process of uploading document image data to the server 10 from the student terminal 40 with reference to FIG. 29.

Figure 29:
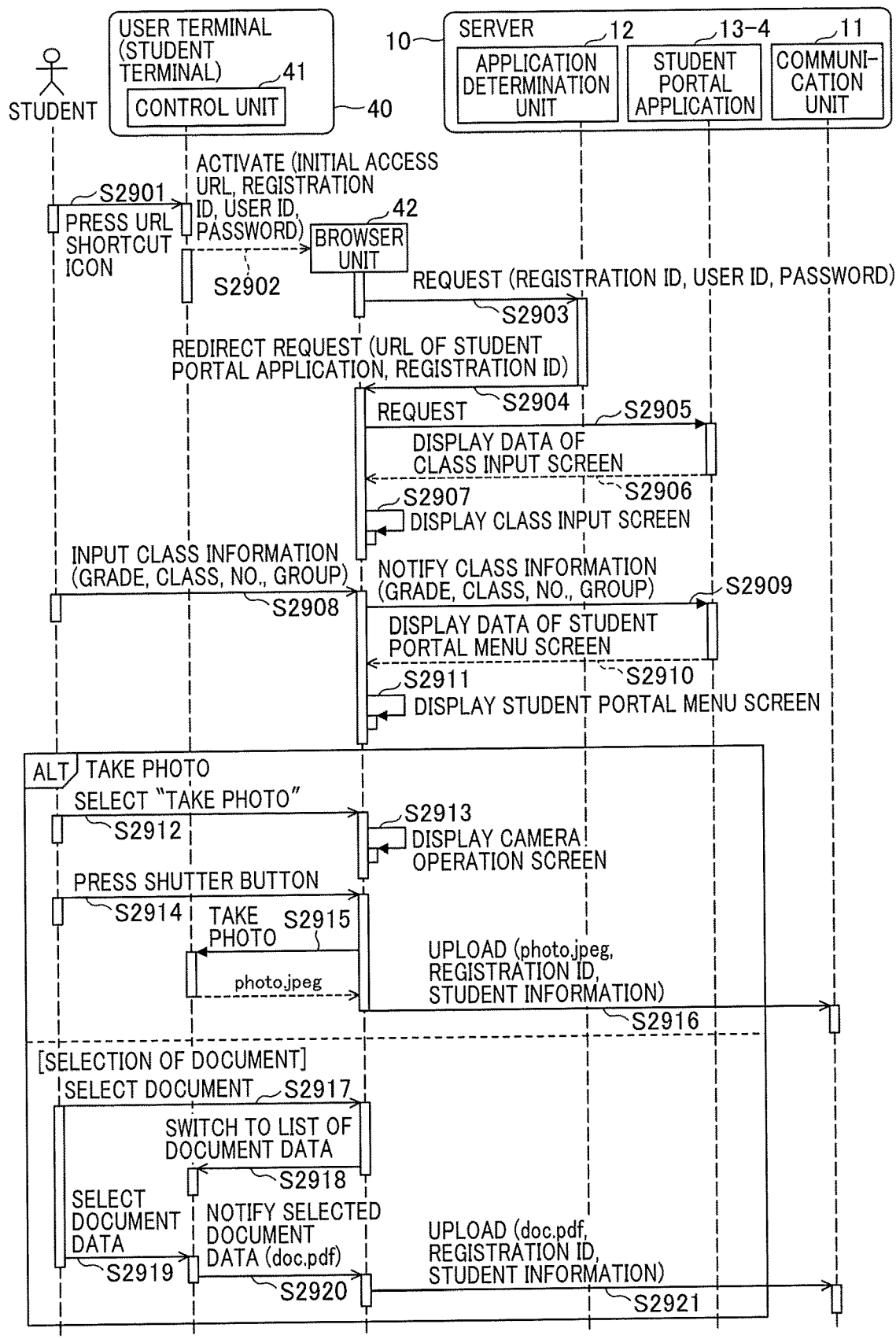
FIG. 29 is an example sequence diagram illustrating a process of uploading document image data from a student terminal to a server.

FIG. 29 is an example sequence diagram illustrating a process of uploading document image data from the student terminal 40 to the server 10.

At the student terminal 40, the control unit 41 detects the pressing of a URL shortcut icon displayed on the student terminal 40 by a student who is a user of the student terminal 40 (step S2901).

The URL shortcut icon displayed on the student terminal 40 embeds the tag information including an initial access URL for connecting to the server 10 and the registration ID of "Tag_St" indicating the concerned service to be provided to the student terminal 40. The registration ID of "Tag_Sd" is associated with the application ID of "AP_StPortal" in the registration information storage unit 124 (FIG. 9).

When the pressing of the URL shortcut icon is detected at the student terminal 40 (step S2901), the student terminal 40 activates the browser unit 42 and connects to a destination designated by the initial access URL embedded in the URL shortcut icon (step S2902).

In response to the activation of the browser unit 42 (step S2902), the browser unit 42 automatically transmits an HTTP request to the application determination unit 12 corresponding to the initial access URL embedded in the URL shortcut icon (step S2903). The HTTP request includes the account information (user ID and password) in addition to the target registration ID. In this example case, it is assumed that one piece of account information is associated with the entire students.

In response to receiving the HTTP request (step S2903), the application determination unit 12 of the server 10 authenticates the information included in the HTTP request. If the authentication is successful in step S2903, steps S2904 and subsequent steps are performed.

If the authentication is successful (step S2903), the application determination unit 12 transmits a response (HTTP response) including a redirect request to the browser unit 42 (step S2904).

The redirect request includes a URL of a student portal application 13-4 (hereinafter, "student portal URL") related to the In-application ID of "AP_StPortal" stored in the registration information storage unit 124 (FIG. 9) in association with the target registration ID of "Tag_St," as the redirect destination. The student portal URL can be specified by referring to the application information storage unit 121 (FIG. 10). The student portal application 13-4 is one of applications included in the input application group 13.

In accordance with the redirect request (step S2904), the browser unit 42 transmits (redirects) an HTTP request to the student portal URL (i.e., student portal application 13-4) set as the redirect destination (step S2905).

In response to receiving the HTTP request (step S2905), the student portal application 13-4 transmits, to the browser unit 42 of the student terminal 40, a response including display data of an upload screen to be used for uploading the document image data and a script to execute the uploading (step S2906). The script and display data are examples of data indicating the request for executing the processing to the student terminal 40.

In response to receiving the response (step S2906), the browser unit 42 generates a class input screen based on the display data as a part of the uploading procedure, and displays the class input screen on the output device of the student terminal 40 (step S2907).

In response to receiving an input of class information by the student (step S2908), the browser unit 42 notifies the input class information to the student portal application 13-4 (step S2909).

Then, the student portal application 13-4 transmits, to the browser unit 42, display data to be used for rendering a student portal menu screen corresponding to the class information (step S2910).

Then, the browser unit 42 displays the student portal menu screen based on the display data on the student terminal 40 (step S2911). On the student portal menu screen, for example, capturing of image data and selection of to-be-uploaded image data and/or document data are performed.

Hereinafter, a description is given of an operation when the capturing of image data is selected on the student portal menu screen with reference to FIG. 29.

When the student terminal 40 receives a selection of an icon of "take photo" on the student portal menu screen (step S2912), the browser unit 42 displays a camera operation screen for performing a camera operation (step S2913).

When a press of a shutter button on the camera operation screen is detected at the browser unit 42 (step S2914), the browser unit 42 takes a photograph using a camera service provided by the control unit 41 (step S2915). In other words, the student terminal 40 acquires image data of "photo.jpeg" using a camera function.

Then, the browser unit 42 uploads the image data of "photo.jpeg" to the communication unit 11 (step S2916). At this stage, the browser unit 42 associates the image data of "photo.jpeg" with the registration ID of "Tag_St" and the student information, and then transmits the image data of "photo.jpeg" to the communication unit 11. The student information includes information input or entered on the class input screen displayed in step S2907. Then, the communication unit 11 stores the received image data of "photo.jpeg" in the document image data storage unit 125.

Hereinafter, a description is given of an operation when "select document data" is selected on the student portal menu screen with reference to FIG. 29.

When the student terminal 40 receives a selection of an icon of "selection of document" on the student portal menu screen (step S2917), the browser unit 42 requests the control unit 41 to switch a display on a screen to a document data list (step S2918).

If the control unit 41 receives a selection of document data on the displayed document data list (step S2919), the control unit 41 notifies the selected document data of "doc.pdf" to the browser unit 42 (step S2920).

In response to receiving the notification of the selected document data (step S2920), the browser unit 42 associates the selected document data of "doc.pdf" with the registered ID of "Tag_St" and the student information, and uploads the selected document data of "doc.pdf" to the communication unit 11 (step S2921). Then, the communication unit 11 stores the received document data of "doc.pdf" in the document image data storage unit 125.

In an example case of FIG. 29, the document image data is uploaded from the student terminal 40 to the server 10, but not limited thereto. In the embodiment, the teacher portal menu screen can include a menu for uploading the document image data as one menu of the teacher portal menu screen.

Hereinafter, a description is given of storing document image data by the communication unit 11 into the document image data storage unit 125 with reference to FIG. 30.

Figure 30:
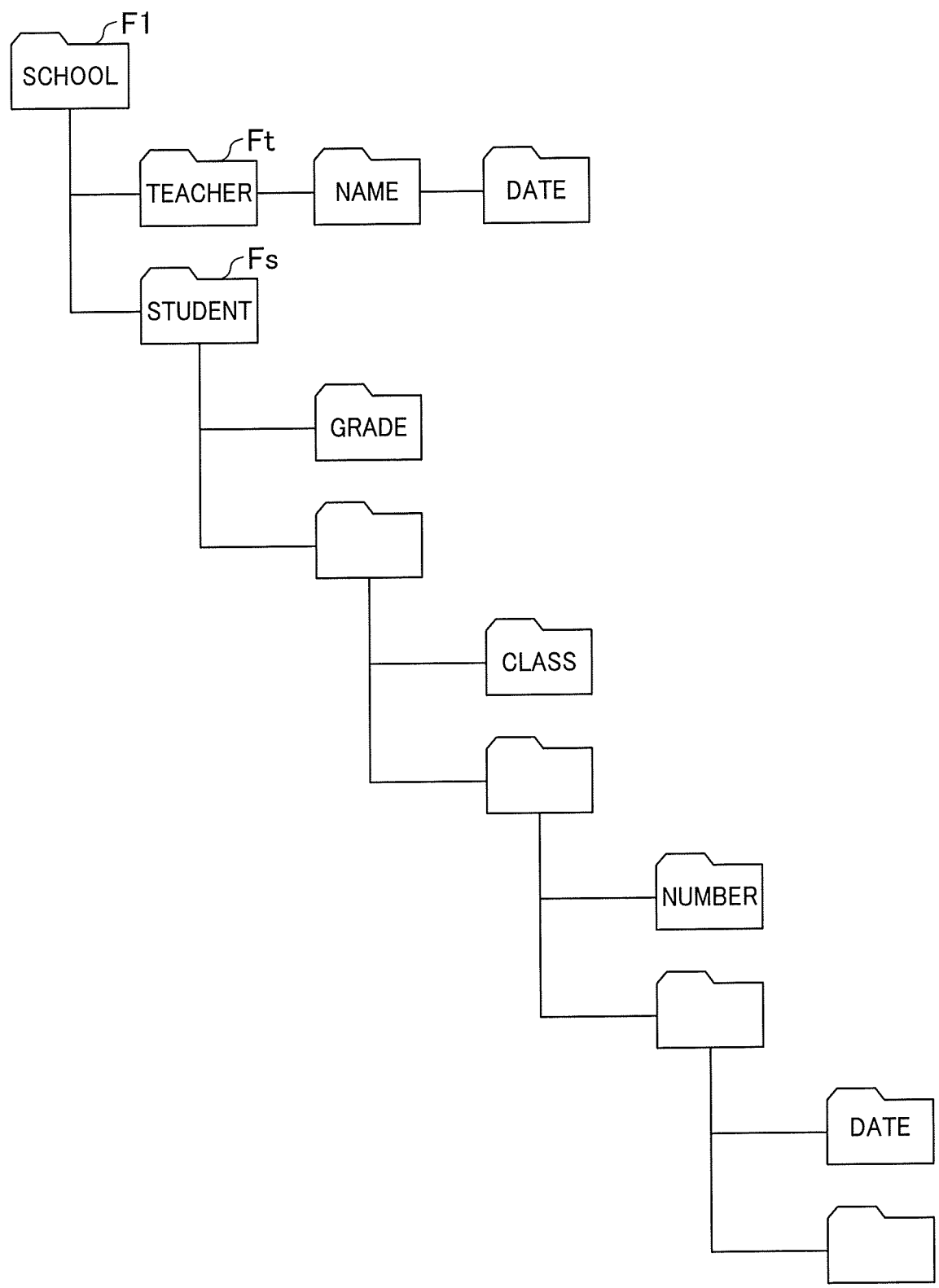
FIG. 30 is a diagram illustrating a conceptual structure of a document image data storage unit.

FIG. 30 is a diagram illustrating a conceptual structure of the document image data storage unit 125. The document image data storage unit 125 stores the document image data for each school by setting folders separately.

In the embodiment, a folder "F1" corresponding to a school includes a folder "Ft" set for teacher and a folder "Fs" set for student under the folder "F1."

The document image data stored in the folder "Ft" for teacher may be classified in accordance with, for example, name, date and file name of the concerned teacher. In other words, a personal folder can be provided for each teacher under the folder "Ft."

Further, the document image data stored in the folder "Fs" for student is classified in accordance with, for example, grade, class, student number, date, and file name. Further, a group can be included for the student classification.

Hereinafter, a description is given of the document image data storage unit 125 with reference to FIG. 31. FIG. 31 is an example of configuration of the document image data storage unit 125.

The document image data storage unit 125 stores information items, for example, tenant ID, file ID, file name, date, format, number of pages, teacher/student classification, grade, class, student number, and group, and the information item of "tenant ID" is associated with other information items.

Hereinafter, a description is given of an example of a display style on the student terminal 40 with reference to FIG. 32. FIG. 32 is an example of a display style of a screen 321 and a screen 325 displayed on the student terminal 40.

The screen 321 (FIG. 32) is a class input screen displayed on the student terminal 40 in step S2907 of FIG. 29. The screen 321 includes, for example, an input field 322 to input grade, class, student number, and group of student, and a message 323 prompting a user to input information into the input field 322, and an operation button 324 for shifting or transiting to the student portal menu screen.

Further, the screen 325 (FIG. 32) is a student portal menu screen displayed on the student terminal 40 in step S2911 of FIG. 29. The screen 325 includes, for example, operation buttons 326 and 327. The operation button 326 is operated for selecting "take photo" while the operation button 327 is operated for selecting "select photo/document."

As to the student terminal 40, for example, when the operation button 326 is operated, the camera application is activated and image data can be captured, and when the operation button 327 is operated, the screen displays the document data list.

As to the above described embodiment, the teacher terminal 30 and the output apparatus 50 can be linked with each other by simply inputting the passcode displayed on the output apparatus 50 by the teacher at the teacher terminal 30. Further, as to the above described embodiment, the operation such as the page turning operation performed at the teacher terminal 30 can be reflected as an operation for the document image data displayed on the output apparatus 50.

Further, as to the above described embodiment, among the services associated with the registration ID, the concerned service associated with the Out-application ID is provided to the teacher terminal 30 alone. Therefore, as to the above described embodiment, an erroneous output of document image data to the output apparatus 50 by a student not having the access right to use the output apparatus 50 can be prevented.

As to the above described embodiment, the information processing system 1 is described as a system introduced in educational organizations such as schools, but not limited to thereto. For example, the information processing system 1 can be introduced to another organization, such as companies.

In this case, the input screen of passcode may be displayed on the user terminal of the user having the access right to operate the output apparatus 50.

Further, each of the server 10, the intermediary apparatus 20, the output apparatus 50 and the user terminals 30 and 40 may be disposed as a single computer, or may be constructed using a plurality of computers, each of which can be provided with various units (functions or means) by dividing the functions.

Second Embodiment

Hereinafter, a description is given of an information processing system of a second embodiment with reference to FIG. 33. In the second embodiment, the information processing system is assumed to be used for conferences, different from the first embodiment. In the description of the second embodiment, the same reference numerals are given to those having the same functional configuration as those of the first embodiment, and the description thereof will be omitted.

Figure 33:
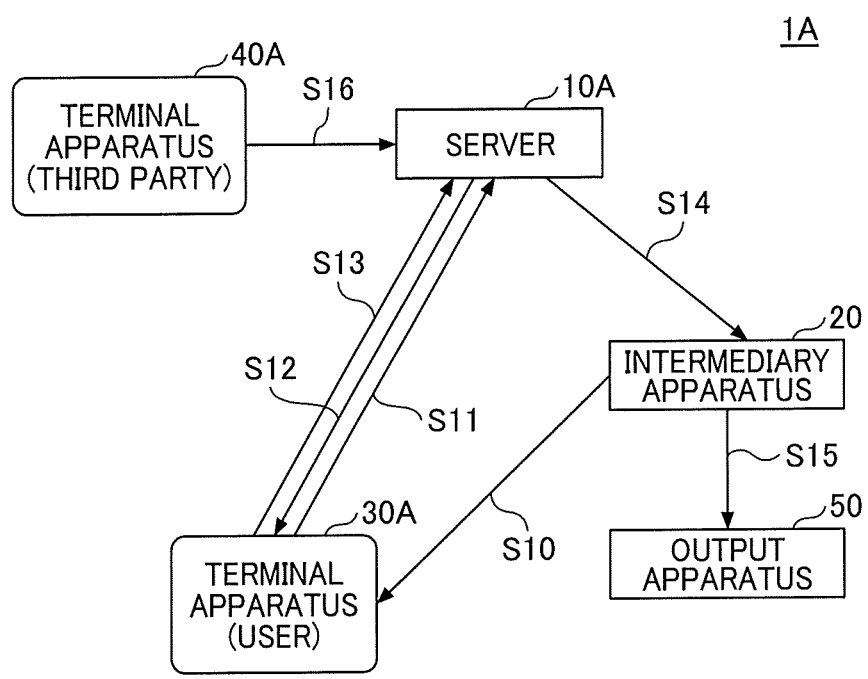
FIG. 33 is a diagram illustrating a scheme of an information processing system according to a second embodiment.

FIG. 33 is a diagram illustrating a scheme of an information processing system 1A according to the second embodiment. In an example case of FIG. 33, the information processing system 1A is used for a conference in a company, and a terminal apparatus 30A is a terminal apparatus mainly used by a participant of the conference, which may perform presentation using the output apparatus 50. Further, the terminal apparatus 40A is a terminal apparatus for initializing the state of the output apparatus 50 useable by the terminal apparatus 30A, and the terminal apparatus 40A is used by a third party other than the participants of the conference.

In the second embodiment, the output apparatus 50 is a display device disposed in a conference room and the like, and can be, for example, an electronic whiteboard or a projector. Further, in the second embodiment, a two-dimensional code including specific information (identification information) is displayed on the output apparatus 50 in advance by the server 10A. The two-dimensional code is, for example, QR code (registered trademark). The QR code displayed on the output apparatus 50 is read by the terminal apparatus 30A used by a participant participating or attending the conference held in the conference room where the output apparatus 50 is disposed (step S10).

In response to reading the QR code (step S10), the terminal apparatus 30A accesses the server 10A based on a URL included in the QR code (step S11), and then acquires an application used for performing a presentation (step S12).

After the application is activated, the terminal apparatus 30A notifies the specific information (identification information) included in the QR code to the server 10A (step S13).

After the specific information (identification information) is notified to the server 10A (step S13), the server 10A notifies a connection to the terminal apparatus 30A to the intermediary apparatus 20 associated with the output apparatus 50 based on the specific information (identification information) (step S14).

In the second embodiment, information can be output from the terminal apparatus 30A to the output apparatus 50 via the intermediary apparatus 20 by performing the above procedure.

Therefore, when a document file is uploaded from the terminal apparatus 30A to the server 10A, the intermediary apparatus 20 outputs the document file to the output apparatus 50 (step S15). In other words, the terminal apparatus 30A can be associated with the output apparatus 50, and the output apparatus 50 can be used by the terminal apparatus 30A. If the terminal apparatus 30A is associated with the output apparatus 50 and the session has been established between the terminal apparatus 30A and the server 10A, the document file can be output from the terminal apparatus 30A to the output apparatus 50 via the server 10A and the intermediary apparatus 20 without reading the QR code again.

The terminal apparatus 40A can be configured to cancel the association of the terminal apparatus 30A and the output apparatus 50, and to initialize the terminal apparatus 30A to the state that the use of the output apparatus 50 cannot be performed unless the association processing of the terminal apparatus 30A is performed again.

For example, when the conference held in the conference room where the output apparatus 50 is disposed has been completed, but the operation to cancel the association with the output apparatus 50 is not yet performed by the terminal apparatus 30A and thereby other user cannot use the output apparatus 50, the initialization using the terminal apparatus 40A is performed. In this state, not only the other user cannot use the output apparatus 50 but also the terminal apparatus 30A may output the document file, which is not intended by the user of the terminal apparatus 30A, to the output apparatus 50. Therefore, in the second embodiment, this state can be cancelled by the third party using the terminal apparatus 40A. The third party may be, for example, an administrator who has managed the output apparatuses 50 and conference rooms where the output apparatuses 50 are disposed.

Specifically, the terminal apparatus 40A reads, for example, an initialization QR code including information identifying the output apparatus 50, and transmits an initialization request to the server 10A (step S16). When the server 10A receives the initialization request from the terminal apparatus 40A, the server 10A cancels the association between the output apparatus 50 and the terminal apparatus 30A, in which the use of the output apparatus 50 becomes impossible unless the QR code is read by the terminal apparatus 30A again.

Thus, in the second embodiment, the third party using the terminal apparatus 40A can disable the use of the output apparatus 50 by the user of the terminal apparatus 30A.

Figure 34:
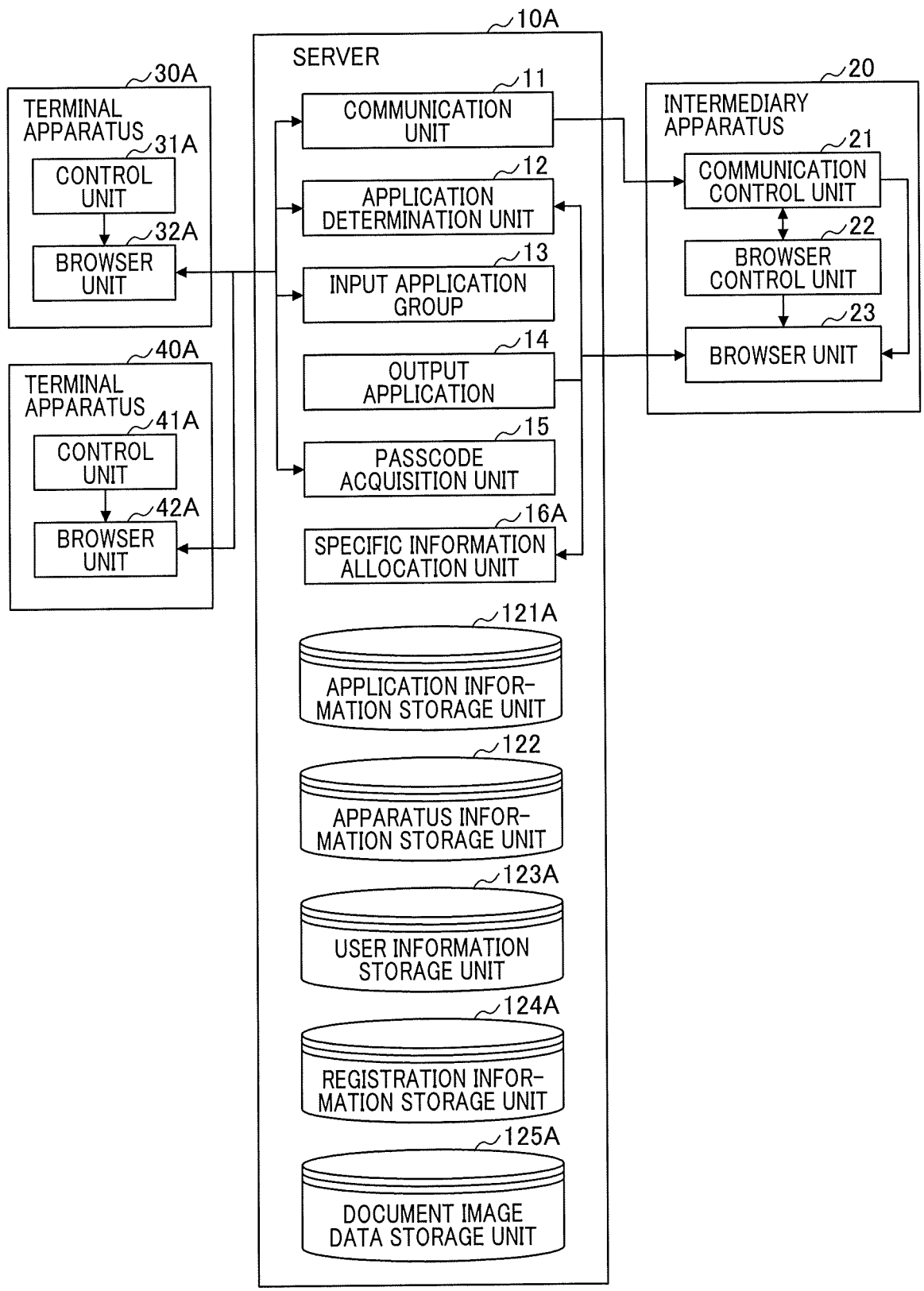
FIG. 34 is an example block diagram of a functional configuration of each apparatus in the information processing system according to the second embodiment.

Hereinafter, a description is given of each apparatus in the information processing system 1A of the second embodiment with reference to FIG. 34. FIG. 34 is an example block diagram of a functional configuration of each apparatus according to the second embodiment.

As indicated in FIG. 34, the terminal apparatus 30A includes, for example, a control unit 31A and a browser unit 32A. The terminal apparatus 40A includes, for example, a control unit 41A and a browser unit 42A. The control unit 31A and the control unit 41A are same as the control unit 31 and the control unit 41 of the first embodiment, and the browser unit 32A and the browser unit 42A are same as the browser unit 32 and the browser unit 42 of the first embodiment.

As indicated in FIG. 34, the server 10A includes, for example, a communication unit 11, an application determination unit 12, an input application group 13, an output application 14, a passcode acquisition unit 15, and a specific information allocation unit 16A. Further, the server 10A includes an application information storage unit 121A, an apparatus information storage unit 122, a user information storage unit 123A, a registration information storage unit 124A, and a document image data storage unit 125A.

As to the second embodiment, the input application group 13 includes a presentation-use application that provides a service for performing a presentation using the output apparatus 50. Further, the input application group 13 includes a presentation-closing application used for closing a presentation that provides a service to end or terminate the presentation using the output apparatus 50. In the following description, the presentation-use application is referred to as the presentation application, and the application used for closing presentation is referred to as the presentation-closing application.

The specific information allocation unit 16A of the server 10A generates a QR code including a passcode, an initial access URL, a registration ID associated with the presentation application, and displays the QR code using the output apparatus 50.

The document image data storage unit 125A can store the document image data output to the output apparatus 50, which is used for the presentation using the output apparatus 50.

Hereinafter, a description is given of the application information storage unit 121A, the user information storage unit 123A, and the registration information storage unit 124A, respectively, with reference to FIGS. 35 to 37.

FIG. 35 is an example of the application information storage unit 121A according to the second embodiment. The application information storage unit 121A includes information 121A-1 related to the presentation application, and information 121A-2 related to the presentation-closing application.

The information 121A-1 related to the presentation application includes, for example, application ID of the presentation application, such as "AP_Presen," application type, URL, and corresponding browser. Further, the information 121A-2 related to the presentation-closing application includes, for example, application ID of the presentation-closing application, such as "AP_PreEnd," application type, URL, and corresponding browser.

In an example case of FIG. 35, the browser type includes, for example, a browser used for the terminal indicating the browser unit of the terminal apparatus 30A and the terminal apparatus 40A, and a browser used for the apparatus indicating the browser unit 23 of the intermediary apparatus 20.

Hereinafter, a description is given of the user information storage unit 123A with reference to FIG. 36. FIG. 36 is an example of the user information storage unit 123A according to the second embodiment.

As indicated in FIG. 36, the user information storage unit 123A stores, for example, user information associating information items of tenant ID, user ID, useable application, useable browser, and in-use browser with each other for each user (user, third party) who is allowed to use each application installed on the server 10A.

In the second embodiment, the user ID is information identifying the terminal apparatuses 30A and 40A or each user of the terminal apparatuses 30A and 40A, and the useable browser is information identifying the output apparatus 50 associated with the terminal apparatus 30A. Further, the in-use browser is information indicating the output apparatus 50 that can be used by the terminal apparatus 30A.

In the second embodiment, if the user ID is not input from the terminal apparatus 30A, guest account information for a guest is provided. In an example case of FIG. 36, the guest account information includes "guest1" and "guest2" as the user ID. Further, in an example case of FIG. 36, the application ID of the presentation application and the application ID of the presentation-closing application are associated with each other for each user ID.

Further, the user information storage unit 123A associates each user ID, the useable browser, and the in-use browser with each other. Therefore, in an example case of FIG. 36, for example, a browser that can be used by the user ID of "guest 1" corresponds to the browser having the browser ID of "BROWSER1," and it can be confirmed that the browser having the browser ID of "BROWSER1" is being in use currently.

Further, as to the second embodiment, if a specific browser ID of the "in-use browser" is not associated with a specific user ID in the user information storage unit 123A (FIG. 36), the specific user ID is required to acquire a new passcode and to be associated with the specific browser.

Hereinafter, a description is given of the registration information storage unit 124A with reference to FIG. 37. FIG. 37 is an example of the registration information storage unit 124A according to the second embodiment.

As indicated in FIG. 37, the registration information storage unit 124A stores "Tag_Presen" as the registration ID identifying the concerned service for performing a presentation using the output apparatus 50. In the registration information storage unit 124A, the registration ID of "Tag_Presen" is associated with the application ID of "AP_Presen" of the presentation application, which is the In-application ID, and the Out-application ID of "AP_PhotoDoc" and the browser ID of "BROWSER1."

Further, the registration information storage unit 124A stores "Tag_PreEnd" as the registration ID identifying the concerned service to end or terminate a presentation using the output apparatus 50. In the registration information storage unit 124A, the registration ID of "Tag_PreEnd" is associated with the application ID of "AP_PreEnd" of the presentation-closing application, which is the In-application ID, and the Out-application ID of "AP_PhotoDoc" and the browser ID of "BROWSER1."

Figure 38B:
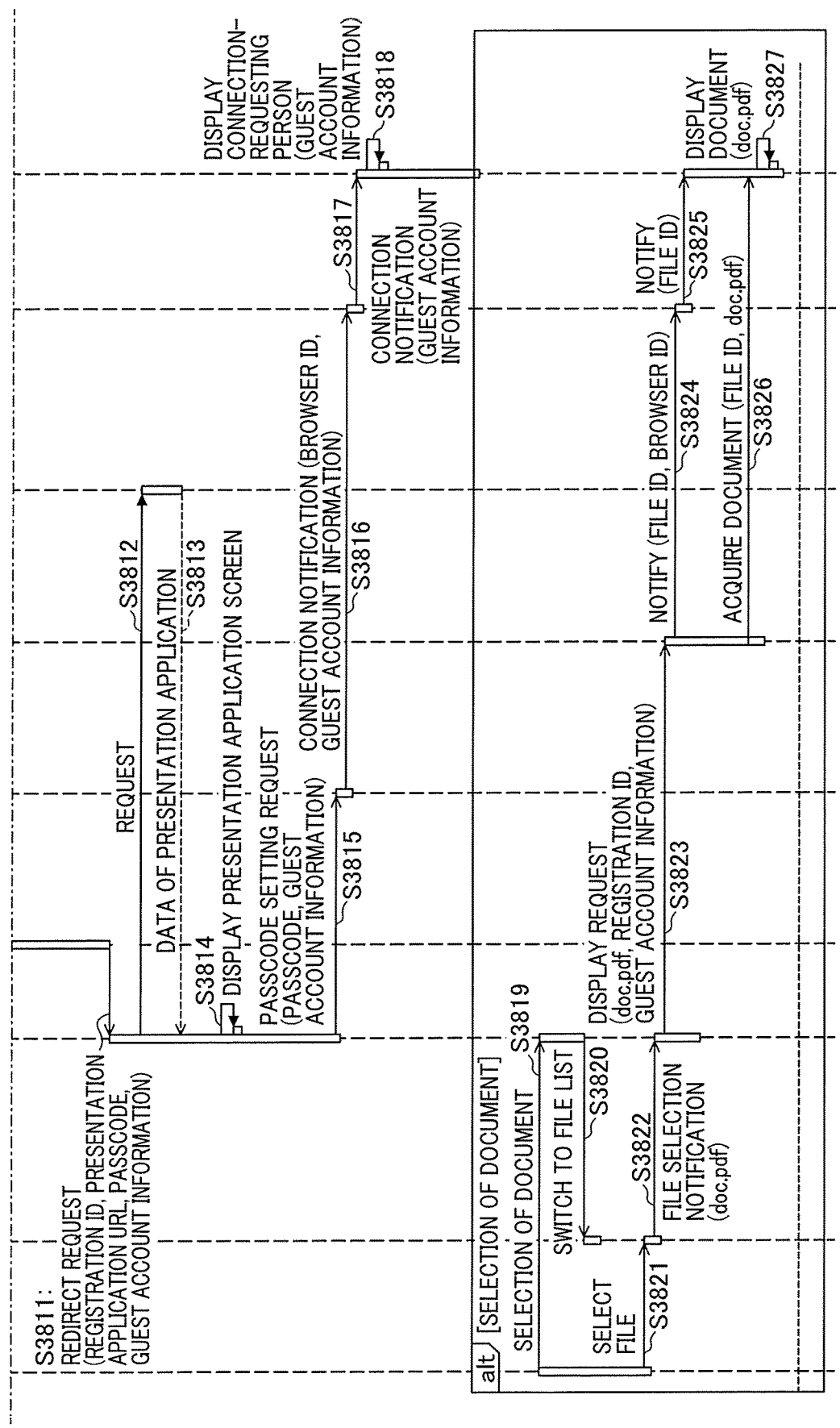

Hereinafter, a description is given of processing when the terminal apparatus 30A logs in the information processing system 1A and then performs a presentation using the output apparatus 50 with reference to FIG. 38. FIGS. 38A and 38B (FIG. 38) are an example sequence diagram of processing when the terminal apparatus performs a presentation using the output apparatus 50 in the second embodiment.

In the information processing system 1A, the output apparatus 50 displays a QR code (registered trademark) including a passcode allocated by the specific information allocation unit 16A of the server 10A (step S3801). The QR code is embedded with the passcode, the initial access URL, the application ID of "AP_Presen" of the presentation application, and the registration ID of "Tag_Presen" associated with each other.

The QR code is an example of the specific information (identification information). The QR code is generated in a way to be different for each of the intermediary apparatuses 20, and the QR code is changed periodically.

In the information processing system 1A, if an operation to read the QR code displayed on the output apparatus 50 is performed using the terminal apparatus 30A (step S3802), the terminal apparatus 30A captures an image of the QR code (step S3803).

Then, the control unit 31A of the terminal apparatus 30A acquires the registration ID associated with the passcode, the initial access URL, and the application ID of the presentation application from the captured image of QR code (step S3804).

Then, the control unit 31A of the terminal apparatus 30A activates the browser unit 32A (step S3805).

In response to the activation of the browser unit 32A (step S3805), the browser unit 32A automatically transmits an HTTP request to the application determination unit 12 of the server 10A corresponding to the initial access URL (step S3806).

Hereinafter, a description is given of a case that the HTTP request includes the registration ID and the passcode but does not include the account information.

In this case, the application determination unit 12 notifies, to the browser unit 32A of the terminal apparatus 30A, a URL of a screen to be used for selecting a log-in or not (step S3807).

Then, the browser unit 32A displays the screen used for selecting the log-in indicated by the URL (step S3808).

If the browser unit 32A receives an operation of selecting "use as guest" without registering the account information (step S3809), the browser unit 12A transmits a notification designating or specifying the "use as guest" to the application determination unit 12 (step S3810).

In response to receiving the notification designating or specifying the "use as guest" (step S3810), the application determination unit 12 transmits a response (HTTP response) including a redirect request to the browser unit 32A (step S3811).

The redirect request includes the registration ID, a URL of a presentation application 13-5, the passcode, and the guest account information as the redirect destination. The guest account information is a guest ID issued by the application determination unit 12. The guest ID can be newly issued for the guest account or can use the user ID stored previously for the guest account.

The registration ID is the registration ID of "Tag_Presen" obtained or acquired from the QR code. The URL of presentation application 13-5 can be specified or identified by the In-application ID of "AP_Presen" associated with the registration ID of "Tag_Presen" in the registration information storage unit 124A (FIG. 37), and the application information storage unit 121A (FIG. 35).

The application determination unit 12 can update the user information storage unit 123A (FIG. 36). Specifically, the application determination unit 12 determines that the In-application ID of "AP_Presen" and the Out-application ID of "AP_PhotoDoc" associated with the registration ID of "Tag_Presen" as the useable applications for the issued guest ID. Further, the application determination unit 12 determines that the browser ID of "BROWSER1" associated with the registration ID of "Tag_Presen" as the useable browser and the in-use browser. Then, the application determination unit 12 stores the guest ID, the useable application, the useable browser, and the in-use browser in the user information storage unit 123A (FIG. 36) in association with each other.

In accordance with the redirect request (step S3811), the browser unit 32A transmits (redirects) an HTTP request to the presentation application URL (i.e., presentation application 13-5), which is a redirect destination (step S3812).

In response to receiving the HTTP request (step S3812), the presentation application 13-5 is downloaded to the browser unit 32A of the terminal apparatus 30A (step S3813).

Then, the browser unit 32A activates the presentation application 13-5 and displays a top screen of the presentation application 13-5 (step S3814).

Then, the browser unit 32A transmits a passcode setting request to the passcode acquisition unit 15 of the server 10A (step S3815). The passcode setting request includes the passcode obtained or acquired from the QR code, and the guest account information.

In response to receiving the passcode setting request (step S3815), the passcode acquisition unit 15 of the server 10A transmits a connection notification to the communication control unit 21 of the intermediary apparatus 20 (step S3816). The connection notification includes the browser ID associated with the passcode in the apparatus information storage unit 122, and the guest account information.

In response to receiving the connection notification (step S3816), the communication control unit 21 notifies the guest account information to the browser unit 23 (step S3817), and then the browser unit 23 displays the guest account information of a person who has requested the connection to the intermediary apparatus 20 using the output apparatus 50 (step S3818).

The above processing procedure is executed for connecting the terminal apparatus 30A and the intermediary apparatus 20 with each other. Hereinafter, a description is given of a processing procedure for displaying a document file selected at the terminal apparatus 30A using the output apparatus 50 with reference to FIG. 38.

At the terminal apparatus 30A, if the browser unit 32A receives an operation for instructing a selection of document file (step S3819), the browser unit 32A requests the control unit 31A to switch a display on a screen to a file list (step S3820).

When a document file is selected from the file list (step S3821), the control unit 31A notifies document selection notification that the selected document file to the browser unit 32A (step S3822).

In response to receiving the document file selection notification (step S3822), the browser unit 32A transmits a display request to the communication unit 11 of the server 10A (step S3823). The display request includes the selected document file of "doc.pdf," the registration ID of "Tag_Presen," and the guest account information.

Further, the communication unit 11 determines whether or not the guest ID (user ID) included in the guest account information is associated with the browser ID of the in-use browser in the user information storage unit 123A (FIG. 36). If the communication unit 11 determines that the guest ID is associated with the browser ID of the in-use browser, the sequence proceeds to step S3824. Further, if the guest ID is not associated with the browser ID of the in-use browser, the communication unit 11 returns an error notification to the terminal apparatus 30A.

Then, the communication unit 11 notifies a display request to the communication control unit 21 of the intermediary apparatus 20 having the browser unit 23 specified or identified by the browser ID of "BROWSER1" associated with the registration ID of "Tag_Presen" in the registration information storage unit 124A (step S3824). The display request includes the file ID of the selected document file of "doc.pdf" and the browser ID of "BROWSER1."

In response to receiving the display request notification (step S3824), the communication control unit 21 notifies, to the browser unit 23, the display request of the document file corresponding to the file ID (step S3825).

In response to receiving the display request notification (step S3825), the browser unit 23 acquires or obtains the document file corresponding the file ID from the communication unit 11 (step S3826), and then outputs the acquired document file to the output apparatus 50 (step S3827). In other words, the browser unit 23 displays the acquired document file using the output apparatus 50.

The above processing procedure is performed when the presentation using the output apparatus 50 is performed. As to the above described second embodiment, the user of the terminal apparatus 30A that performs the presentation can output the document file stored in the terminal apparatus 30A to the output apparatus 50 by simply reading the QR code displayed on the output apparatus 50.

The file output from the terminal apparatus 30A to the output apparatus 50 is not limited to the document file. For example, the terminal apparatus 30A can output a movie image file, an image file, an audio file or the like using the output apparatus 50.

Further, in an example case of FIG. 38, it is assumed that the passcode is included in the QR code displayed on the output apparatus 50, but not limited thereto. For example, the passcode can be displayed on the output apparatus 50. Further, the presentation application URL can be displayed on the output apparatus 50, or the presentation application URL can be input directly to the terminal apparatus 30A. In this way, for example, even if the terminal apparatus 30A is a laptop computer or the like which is not provided with a camera for reading the QR code, the service provided by the presentation application and the service provided by the presentation-closing application can be used.

Hereinafter, a description is given of a procedure for initializing the state of the output apparatus 50 that is set in a state usable by the terminal apparatus 30A with reference to FIGS. 39A to 39C. In other words, this procedure uses the terminal apparatus 40A of the third party not participating the presentation to end or terminate the presentation using the output apparatus 50.

Hereinafter, a description is given of examples of a display style of screen in the information processing system 1A with reference to FIGS. 39A to 39C. FIGS. 39A to 39C are examples of a first display style of a screen according to the second embodiment.

Figure 39A:
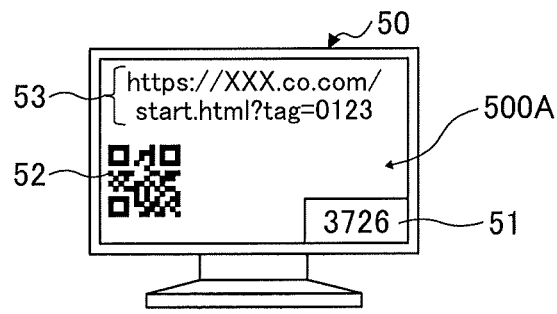
FIGS. 39A, 39B and 39C are examples of a first display style of screen according to the second embodiment.

A screen 500A of FIG. 39A is an example of the first display style using the output apparatus 50 in step S3801 of FIG. 38. The screen 500A displays, for example, a passcode 51, a QR code 52 including a passcode, and a presentation application URL 53.

At this stage, if the terminal apparatus 30A is the terminal having a reading function of the QR code, the QR code 52 can be read. Further, if the terminal apparatus 30A does not have the reading function of the QR code, the passcode can be input as the passcode 51 or the presentation application URL 53 can be input directly.

Figure 39B:
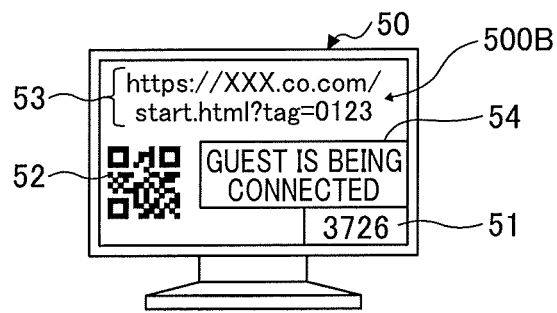

A screen 500B of FIG. 39B is an example of the first display style using the output apparatus 50 in step S3818 of FIG. 38. The screen 500B displays the passcode 51, the QR code 52, and the presentation application URL 53 using the output apparatus 50, and a message 54 indicating that the terminal apparatus 30A is associated with the output apparatus 50. In other words, the message 54 indicates that the terminal apparatus 30A is connected to the intermediary apparatus 20 associated with the output apparatus 50.

Further, since the message 54 is "guest is being connected," it can be confirmed that the guest account information is provided to the terminal apparatus 30A associated with the output apparatus 50.

Figure 39C:
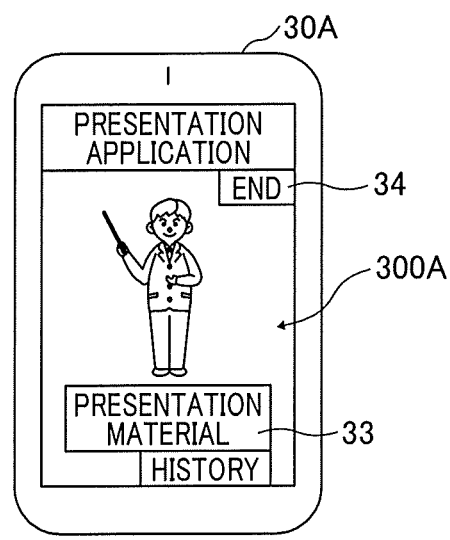

A screen 300A of FIG. 39C is an example of a top screen of the presentation application 13-5 displayed on the terminal apparatus 30A in step S3814 of FIG. 38.

The screen 300A displays a button 33 and a button 34. The button 33 is used to transit or shift the display content on the screen to a list for selecting a document file to be output to the output apparatus 50.

The button 34 is used to end or terminate a presentation by the terminal apparatus 30A using the output apparatus 50. In other words, the button 34 is designed to cancel the association between the terminal apparatus 30A and the output apparatus 50 and to initialize the output apparatus 50.

In the second embodiment, when the button 34 is operated at the terminal apparatus 30A, the browser unit 32A notifies an instruction of terminating the presentation application 13-5 to the application determination unit 12.

When the application determination unit 12 receives the termination instruction, the application determination unit 12 sets a state that there is no in-use browser corresponding to the user ID issued to the terminal apparatus 30A in the user information storage unit 123A (FIG. 36). In other words, when the application determination unit 12 receives the termination instruction, the application determination unit 12 sets a value of the information item of "in-use browser" in the user information, including the guest ID issued to the terminal apparatus 30A, to "vacant" in the user information storage unit 123A (FIG. 36).

In the second embodiment, the application determination unit 12 cancels the association between the terminal apparatus 30A and the output apparatus 50 by performing the above described processing.

Figure 40:
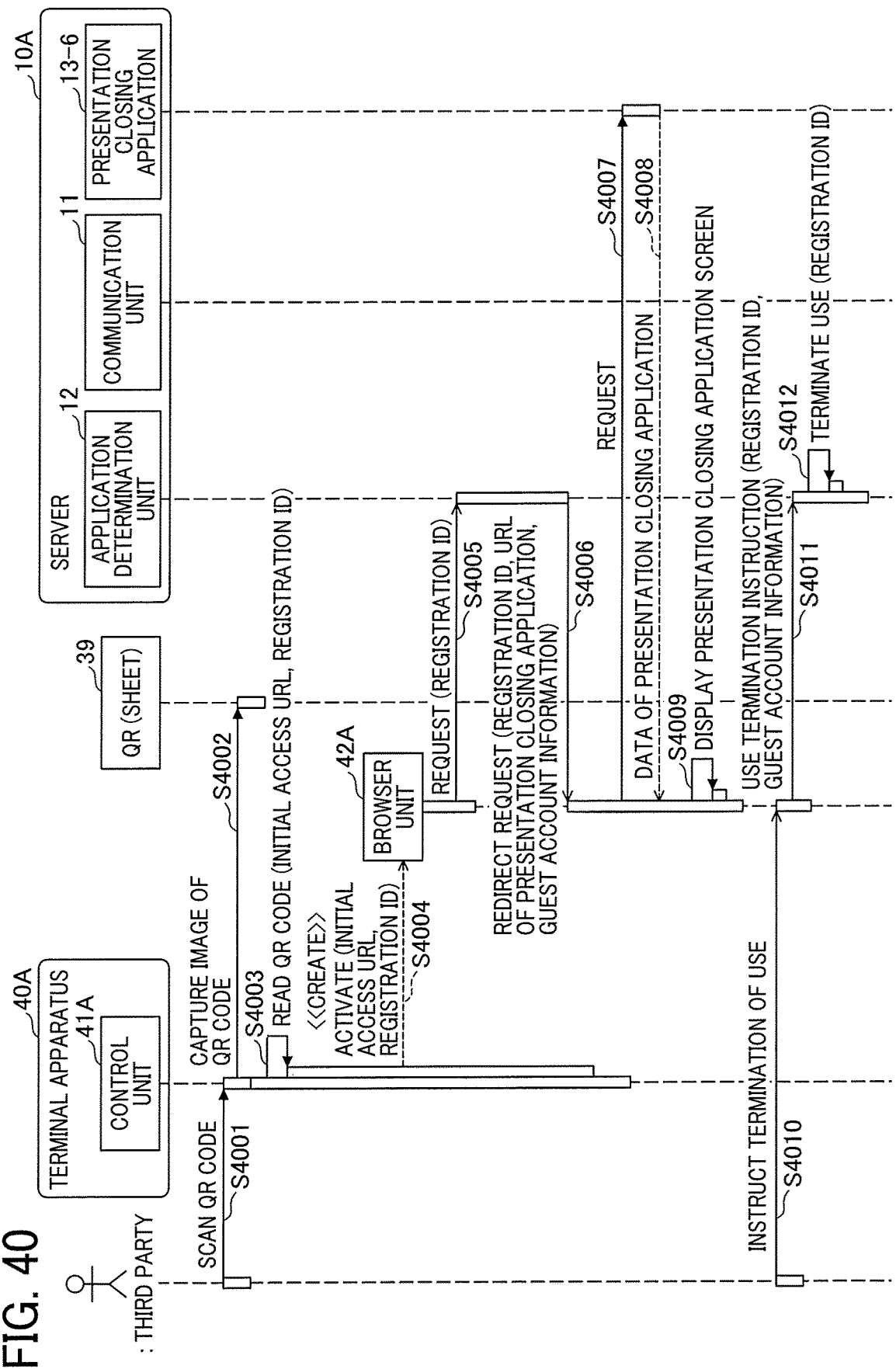
FIG. 40 is an example sequence diagram of a process of terminating a presentation using an output apparatus according to the second embodiment.

Hereinafter, a description is given of a case that the third party terminates a presentation using the output apparatus 50 with reference to FIG. 40. FIG. 40 is an example sequence diagram of a process of terminating the presentation using the output apparatus 50.

In the information processing system 1A, when the control unit 41A of the terminal apparatus 40A receives an operation of reading or scanning a QR code (step S4001), the terminal apparatus 40A captures an image of the QR code (step S4002).

The to-be-read QR code is a QR code including information used for terminating the presentation using the output apparatus 50, and is prepared in advance and printed on a sheet 39, such as paper. Further, the QR code can be displayed on the output apparatus 50 or on any display apparatus other than the output apparatus 50. In the following description, the QR code used for terminating the presentation is referred to as the termination QR code. In other words, the termination QR code is a QR code for initializing the state of the output apparatus 50.

The termination QR code is embedded with the registration ID associated with the presentation-closing application and the initial access URL. Therefore, the termination QR code is associated with the browser ID in advance. In other words, the termination QR code is associated with the output apparatus 50 identified by the browser ID in advance.

When the control unit 41A of the terminal apparatus 40A reads the termination QR code (step S4002), the control unit 41A acquires the initial access URL, and the registration ID associated with the presentation-closing application from the termination QR code (step S4003).

Then, the control unit 41A activates the browser unit 42A (step S4004).

In response to the activation of the browser unit 42A (step S4004), the browser unit 42A automatically notifies an HTTP request to the application determination unit 12 of the server 10A corresponding to the initial access URL (step S4005). The HTTP request includes the registration ID obtained or acquired from the termination QR code.

In response to receiving the HTTP request (step S4005), the application determination unit 12 transmits a response (HTTP response) including a redirect request to the browser unit 42A (step S4006).

The redirect request includes the registration ID, a URL of a presentation-closing application 13-6, and the guest account information as the redirect destination. The guest account information is a guest ID issued by the application determination unit 12. The registration ID is the registration ID of "Tag_PreEnd" obtained or acquired from the termination QR code. The URL of presentation-closing application 13-6 is specified or identified by the In-application ID of "AP_PreEnd" associated with the registration ID of "Tag_PreEnd" in the registration information storage unit 124A (FIG. 37), and the application information storage unit 121A (FIG. 35).

In accordance with the redirect request (step S4006), the browser unit 42A transmits (redirects) an HTTP request to the presentation-closing application URL (i.e., presentation-closing application 13-6), which is the redirect destination (step S4007).

In response to receiving the HTTP request (step S4007), the presentation-closing application 13-6 is downloaded to the browser unit 42A of the terminal apparatus 40A (step S4008).

Then, the browser unit 42A activates the presentation-closing application 13-6 to display a top screen of the presentation-closing application (step S4009).

Then, the browser unit 42A receives an operation of instructing a termination of the presentation using the output apparatus 50 (step S4010), and then transmits a use termination instruction to the application determination unit 12 (step S4011). The use termination instruction includes the registration ID and the guest account information.

In response to receiving the use termination instruction (step S4011), the application determination unit 12 terminates the presentation using the output apparatus 50 (step S4012).

Specifically, the application determination unit 12 specifies or identifies the browser ID associated with the registration ID in the registration information storage unit 124A (FIG. 37), and then specifies or identifies specific user information including specific in-use browser ID that matches the specified browser ID, in the user information storage unit 123A (FIG. 36). Then, the application determination unit 12 cancels or removes the in-use browser for the specified or identified specific user information.

In other words, the application determination unit 12 sets a value of "in-use browser" included in the specified or identified specific user information to "vacant." In the second embodiment, the terminal apparatus 30A associated with the specified or identified browser ID does not exist by performing the above described processing, and then the use of the output apparatus 50 associated with the browser ID can be terminated, and thereby the output apparatus 50 cannot be used.

Specifically, depending on the determination result in step S3823 of FIG. 38, an error may occur, in which the QR code is required to read again and the QR code is required to associated with the browser ID on the server 10A again.

In the second embodiment, as above described, a state in which the browser ID and the terminal apparatus 30A are associated with each other using the specific information (e.g., passcode) can be changed to another state in which the browser ID and the terminal apparatus 30A are not associated with each other.

Figure 41A:
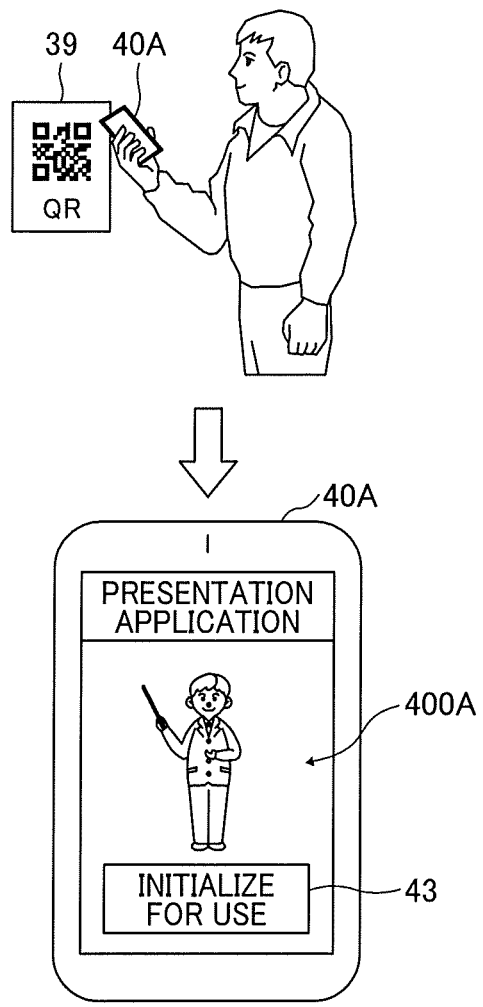
FIGS. 41A and 41B are examples of a second display style of screen according to the second embodiment.
Figure 41B:
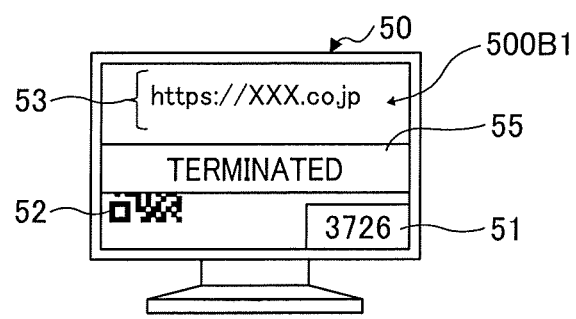

Hereinafter, a description is given of examples of a second display style of screen in the information processing system 1A with reference to FIGS. 41A and 41B. FIGS. 41A and 41B are examples of a second display style of a screen according to the second embodiment.

A screen 400A of the terminal apparatus 40A of FIG. 41A is an example of a screen displayed in step S4009 of FIG. 40.

The screen 400A (FIG. 41A) is displayed on the terminal apparatus 40A when a user of the terminal apparatus 40A reads a termination QR code 45 printed on the sheet 39. The button 43 is displayed on the screen 400A.

When the button 43 is operated on the screen 400A, the terminal apparatus 40A transmits a termination instruction of the presentation using the output apparatus 50 to the application determination unit 12.

A screen 500B1 of FIG. 41B is an example of the second display style using the output apparatus 50 after the presentation using the output apparatus 50 has been terminated.

The screen 500B1 (FIG. 41B) displays the passcode 51, the QR code 52, and the presentation application URL 53. Further, the screen 500B1 displays a message 55 indicating that the presentation using these information has been terminated.

The screen 500B1 (FIG. 41B) can be displayed in both cases when the presentation termination instruction is transmitted from the terminal apparatus 30A and when the presentation termination instruction is transmitted from the terminal apparatus 40A.

Thus, according to the second embodiment, the third party can cancel the association between the output apparatus 50 and the terminal apparatus 30A, and the state of the output apparatus 50 can be initialized. Therefore, according to the second embodiment, for example, the third party can cancel the association between the terminal apparatus 30A and the output apparatus 50 even if there is a participating person who has forgotten to terminate the presentation among the participating persons who participated or attended the conference.

In the second embodiment, the QR code including the specific information (identification information) can be changed periodically. Therefore, in the second embodiment, even if there is a participating person who has forgotten to terminate the presentation among the participating persons who participated or attended the conference, the association between the terminal apparatus 30A and the output apparatus 50 can be cancelled automatically when a given period of time has elapsed and the output apparatus 50 can be initialized without performing a given operation to the output apparatus 50.

Conventionally, the operation of devices or apparatuses have become complicated due to the sophistication of the functions of devices or apparatuses, with which a longer period of time is required for users to assimilate how to use each device or apparatus. Further, since user interfaces of devices or apparatuses may differ depending on the types of devices or apparatuses and manufacturing companies, a longer period of time is further required for the users to assimilate how to use each device or apparatus. Further, information may be shared by an unintended person due to erroneous operations of the devices or apparatuses, causing degrading the confidentiality of information.

As to be above described embodiments, operability of apparatuses or devices (e.g., user friendliness) can be improved, and confidentiality of information can be improved.

The above described embodiments can be configured as follows.

(Configuration 1)

An information processing system includes an intermediary apparatus communicable with an output apparatus (target apparatus), and an information processing apparatus communicable with the intermediary apparatus. The information processing apparatus includes an identification unit that receives, from a terminal, specific information (identification information) and a process execution request input to the terminal, and identifies a specific intermediary apparatus corresponding to a specific apparatus based on the specific information (identification information) in accordance with the process execution request, and a communication unit that transmits the process execution request to the identified specific intermediary apparatus. The specific intermediary apparatus executes or performs processing in accordance with the process execution request transmitted from the communication unit to control the specific apparatus.

(Configuration 2)

As to configuration 1 of the information processing system, the specific information (identification information) is updated by the information processing apparatus over time.

(Configuration 3)

As to configurations 1 or 2 of the information processing system, the information processing apparatus includes a specific information allocation unit that generates the specific information (identification information) and allocates the generated specific information (identification information) to the specific apparatus periodically. The communication unit transmits, to the specific intermediary apparatus, an execution request for executing display processing of the specific information (identification information), and the specific intermediary apparatus causes the specific apparatus, associated with the specific information (identification information), to display the specific information (identification information) allocated to the specific apparatus.
(Configuration 4)

As to any one of configurations 1 to 3 of the information processing system, the information processing apparatus includes a document image data storage unit storing document image data. The communication unit transmits specific document image data, which is selected using the terminal from the document image data stored in the document image data storage unit, to the specific intermediary apparatus, and the specific intermediary apparatus executes processing in accordance with the execution request for the specific document image data transmitted from the communication unit to control the specific apparatus.
(Configuration 5)

As to configuration 4 of the information processing system, when the specific document image data includes data of a plurality of pages, the processing in accordance with the execution request includes switching of page displayed on the specific apparatus.
(Configuration 6)

As to any one of configurations 1 to 5 of the information processing system, the specific information (identification information) is a passcode.
(Configuration 7)

As to any one of configurations 1 to 6 of the information processing system, the specific information (identification information) is image data.
(Configuration 8)

An information processing apparatus, communicable with an intermediary apparatus communicable with an apparatus, includes an identification unit that receives, from a terminal, specific information (identification information) and a process execution request input to the terminal, and identifies a specific intermediary apparatus corresponding to a specific apparatus based on the specific information (identification information) in accordance with the process execution request, and a communication unit that transmits the process execution request to the identified specific intermediary apparatus.
(Configuration 9)

A method of processing information performable using an information processing apparatus, communicable with an intermediary apparatus communicable with an apparatus, includes receiving, from a terminal, specific information (identification information) and a process execution request input to the terminal, identifying a specific intermediary apparatus associated with a specific apparatus based on the specific information (identification information) in accordance with the process execution request, and transmitting the process execution request to the identified specific intermediary apparatus.

The functions of the one or more embodiments described above can be implemented by one or more processing circuits. Each of the functions of the one or more embodiments described above may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

Each of the embodiments described above is presented as an example, and it is not intended to limit the scope of the present disclosure. Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general-purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid-state memory device. The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cashe memory of the CPU, and the RAM may function as a physical memory or a primary memory of the apparatus, while the HDD may function as a secondary memory of the apparatus.

What is claimed is:
1. An information processing system, comprising:
one or more intermediary apparatuses communicable with one or more output apparatuses; and
an information processing apparatus communicable with the one or more intermediary apparatuses, the information processing apparatus including circuitry configured to
receive, from a terminal, specific information and a process execution request input to the terminal, the specific information being displayed on a specific output apparatus of the one or more output apparatuses before being input into the terminal;
identify a specific intermediary apparatus associated with the specific output apparatus on which the specific information is displayed based on the received specific information in accordance with the process execution request; and
transmit the process execution request to the identified specific intermediary apparatus, the identified specific intermediary apparatus being configured to perform processing in accordance with the process execution request transmitted from the circuitry of the information processing apparatus to control the specific output apparatus,
wherein the circuitry of the information processing apparatus is further configured to periodically change the specific information and transmit the changed specific information to the specific intermediary apparatus so that the specific output apparatus sequentially displays different specific information at different times.

2. The information processing system according to claim 1,
wherein the circuitry of the information processing apparatus is further configured to transmit, to the specific intermediary apparatus, an execution request for executing display processing of the specific information, and the specific intermediary apparatus causes the specific output apparatus to display the specific information transmitted to the specific intermediary apparatus.

3. The information processing system according to claim 1,
wherein the information processing apparatus further comprises a memory to store document image data, and
wherein the circuitry of the information processing apparatus is further configured to transmit specific document image data, which is selected using the terminal, from the document image data stored in the memory, to the specific intermediary apparatus, and the specific intermediary apparatus executes processing in accordance with the process execution request, on the specific document image data transmitted from the information processing apparatus to control the specific output apparatus.

4. The information processing system according to claim 3,
wherein when the specific document image data transmitted by the circuitry includes data of a plurality of pages, the processing in accordance with the process execution request includes switching of page displayed on the specific output apparatus.

5. The information processing system according to claim 1, wherein the specific information received by the circuitry is a passcode.

6. The information processing system according to claim 1, wherein the specific information received by the circuitry is image data.

7. The information processing system according to claim 6,
wherein the image data received by the circuitry is a two-dimensional code in which the specific information and identification information identifying a service provided by the information processing system is embedded, and
wherein the specific information is input to the terminal when the terminal reads the two-dimensional code.

8. The information processing system according to claim 1,
wherein when the specific intermediary apparatus, associated with the specific output apparatus, is identified based on the specific information, the circuitry of the information processing apparatus is further configured to store, in the memory, user information associating information identifying the specific output apparatus, information identifying the terminal that has input the specific information, and first information indicating that the specific output apparatus is usable by the terminal that has input the specific information, and wherein when the circuitry of the information processing apparatus receives, from the terminal that has input the specific information, a termination instruction for terminating use of the specific output apparatus, the circuitry of the information processing apparatus is further configured to change the first information indicating that the specific output apparatus is usable by the terminal to second information indicating that the specific output apparatus is not usable by the terminal, in the user information.

9. The information processing system of claim 8,
wherein when the circuitry of the information processing apparatus receives, from another terminal being different from the terminal that has input the specific information, the termination instruction for terminating use of the specific output apparatus, the circuitry of the information processing apparatus is further configured to change the first information indicating that the specific output apparatus is usable by the terminal to the second information indicating that the specific output apparatus is not usable by the terminal in the user information including the information identifying the specific output apparatus.

10. The information processing system according to claim 9,
wherein the another terminal reads a two-dimensional code including the information identifying the specific output apparatus, and transmits the information identifying the specific output apparatus included in the two-dimensional code to the information processing apparatus.

11. The information processing system of claim 1,
wherein the circuitry is further configured to
cause the specific output apparatus to display the specific information on the specific output apparatus after receiving the process execution request, and
receive the specific information from the terminal after causing the specific output apparatus to display the specific information.

12. An information processing apparatus, communicable with one or more intermediary apparatuses communicable with one or more output apparatuses, the information processing apparatus comprising:
circuitry configured to
receive, from a terminal, specific information and a process execution request input to the terminal, the specific information being displayed on a specific output apparatus of the one or more output apparatuses before being input into the terminal;
identify a specific intermediary apparatus associated with the specific output apparatus on which the specific information is displayed based on the received specific information in accordance with the process execution request, and
transmit the process execution request to the identified specific intermediary apparatus,
the identified specific intermediary apparatus being configured to perform processing in accordance with the process execution to control the specific output apparatus,
wherein the circuitry is further configured to periodically change the specific information and transmit the changed specific information to the specific intermediary apparatus so that the specific output apparatus sequentially displays different specific information at different times.

13. A method of processing information using an information processing apparatus, communicable with one or more intermediary apparatuses communicable with one or more output apparatuses, the method comprising:
- receiving, from a terminal, specific information and a process execution request input to the terminal, the specific information being displayed on a specific output apparatus of the one or more output apparatuses before being input into the terminal;
- identifying a specific intermediary apparatus associated with the specific output apparatus on which the specific information is displayed based on the received specific information in accordance with the process execution request; and
- transmitting the process execution request to the identified specific intermediary apparatus,
- the identified specific intermediary apparatus being configured to perform processing in accordance with the process execution to control the specific output apparatus,
- wherein the method further comprises periodically changing the specific information and transmitting the changed specific information to the specific intermediary apparatus so that the specific output apparatus sequentially displays different specific information at different times.

* * * * *